(12) United States Patent
Huberman et al.

(10) Patent No.: US 6,278,452 B1
(45) Date of Patent: Aug. 21, 2001

(54) CONCISE DYNAMIC USER INTERFACE FOR COMPARING HIERARCHICALLY STRUCTURED COLLECTIONS OF OBJECTS

(75) Inventors: Steven A. Huberman, Carlisle; Jonathan A. Bauer, Andover, both of MA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/156,344

(22) Filed: Sep. 18, 1998

(51) Int. Cl.[7] ............................................. G06F 3/00
(52) U.S. Cl. .................. 345/339; 345/356; 345/353; 706/48; 706/50; 707/100; 707/101
(58) Field of Search ................................ 345/348, 356, 345/339, 353, 440, 968; 707/101, 6, 100; 706/50, 48

(56) References Cited

U.S. PATENT DOCUMENTS

| | | | |
|---|---|---|---|
| 5,596,703 | * 1/1997 | Eick et al. | 345/326 |
| 5,974,254 | * 10/1999 | Hsu | 395/703 |
| 5,978,790 | * 11/1999 | Buneman et al. | 707/2 |
| 6,002,399 | * 12/1999 | Haine et al. | 345/348 |
| 6,009,434 | * 10/1998 | Chui et al. | 707/100 |
| 6,072,492 | * 6/2000 | Schagen et al. | 343/353 |
| 6,075,530 | * 6/2000 | Lucas et al. | 345/339 |
| 6,105,062 | * 8/2000 | Andrews et al. | 709/223 |

\* cited by examiner

*Primary Examiner*—Raymond J. Bayerl
*Assistant Examiner*—Cuong T. Thai
(74) *Attorney, Agent, or Firm*—Lyon & Lyon LLP

(57) ABSTRACT

Methods and apparatus for user-directed, efficient comparisons of sets of objects. A user generally selects two sets of objects to be compared. The objects are, in general, hierarchically structured. The user may also specify criteria for selecting a desired subset of objects in the two sets of objects to be compared. In a first phase, the comparison process generates a tree containing nodes representative of each object selected to be compared; an object pair of the sets of objects being compared shares one tree node. Generally, an object pair comprises an object from each of the sets of objects being compared, and an object pair is what is compared. Container nodes are also created which represent folders of the objects being compared. A graphical representation of the tree, or an object view, is displayed as a graphical user interface display on a screen. Once the tree is generated containing nodes for each of the objects selected to be compared, the comparison process performs a comparison of each object pair. The user can select the order of comparison of the object pairs by manipulating the tree nodes in the graphical user interface display. As each object pair is compared, the comparison process generates a result view. As result view comprises the graphical representation of the tree previously generated, with the addition of representations of the result of each object pair comparison performed to that time. The result view, once generated, may be displayed as a graphical usr interface display on the screen.

31 Claims, 21 Drawing Sheets

Directory 1          Directory 2

91 ↔ 91 CORRESPONDING

92 ↔ 92 CORRESPONDING

90 ↔ 90 CORRESPONDING

93 ↔ 93 CORRESPONDING

94 ↔ 95 CORRESPONDING

US 6,278,452 B1

CONCISE DYNAMIC USER INTERFACE FOR COMPARING HIERARCHICALLY STRUCTURED COLLECTIONS OF OBJECTS

FIELD OF THE INVENTION

The present invention pertains to the field of computer systems, including, more particularly, graphical user interfaces and methods for comparing two or more collections of objects.

BACKGROUND OF THE INVENTION

In known methods of comparing two sets of objects, for example, the directories on two computer drives, or the files in two separate folders in a database, or one or more files in two separate databases, the comparison is performed in one phase. In these methods, a user requests the comparison of two sets of objects, which is then performed, and, some time later, the results of the comparison are displayed, or otherwise produced, for the user. Normally, once the comparison is requested, the user has no control over the order of the comparison, and must simply await the results thereof. A lack of control over the order of the comparison may be undesirable, especially with comparisons of large files, or many files, as the time required for the comparison can often be quite lengthy.

Further, in known comparison methods, the user may have to wait for the entire comparison to be completed before they are apprised of any of the results thereof. Too, if the user prematurely ends a comparison, i.e., stops it before it is complete, the user may not be notified of, or otherwise made aware of, any of the results of the comparison that were generated as of the time the comparison was prematurely ended.

As an example, referring to FIG. 1A, a user requests a comparison of five files in each of two computer directories. The user is fairly sure one of the files, file 90, is different in the two computer directories. However, the user wants to ensure that all the five files in each of the two directories are equivalent, and, thus, includes them all in the comparison request.

In known comparison methods, the corresponding files in each of the directories are compared in a top down fashion. Thus, corresponding files 91 will be compared first, corresponding files 92 will be compared second, corresponding files 90 will be compared next, and so on.

As depicted in FIG. 1A, the corresponding files 91, the corresponding files 92 and the corresponding files 94 are relatively large, and the comparison of them could be lengthy. The user may have to wait for all five corresponding files to be compared before they can learn whether one or more, including suspected corresponding files 90, are different.

As the comparison may take longer than the user wishes, the user can generally end it prematurely. However, in known systems, the user may not be notified of the results obtained for comparisons made prior to the premature end of the comparison process.

In the example of FIG. 1A, if the user prematurely ends the comparison process during the comparison of the second corresponding files 92, the user is not notified of the results of the comparison of the first corresponding files 91. Further, the comparison is never made, and the user is never apprised of the results of the suspect corresponding files 90.

Also in known methods for comparing two sets of objects, the results of the comparison are displayed in two separate trees, as shown in FIG. 1B. The first, or leftmost, tree 70 represents the objects, or items, in a first set of objects compared. The second, or right-most, tree 72 represents the objects, or items, in a second set of objects compared.

The objects of Directory1a 74 of Directory1 76 in the example of FIG. 1B were compared from two separate sources. The first source, represented by the left-most tree 70, contains objects itema 78, itemb 79 and itemc 80. The second source, represented by the right-most tree 72, contains objects itema 81, itemc 82 and itemd 83. The itema 78 object from the first source and the itema 81 object from the second source comprise an object pair, and were, thus, compared in the comparison process. The itemc 80 object from the first source and the itemc 82 from the second source also comprise an object pair, and were compared in the comparison process.

The itemb 79 object of the first source does not have a corresponding object in the second source, and thus, was not compared in the comparison method. Likewise, the itemd 83 object of the second source does not have a corresponding object in the first source, and was also, therefore, not compared in the comparison method.

The results of the comparison indicate that corresponding objects, or object pair, itema 78 and itema 81 are equal, or otherwise equivalent. The results of the comparison also indicate that corresponding objects, or object pair, itemc 80 and itemc 82 are not equal; i.e., they are different.

As shown in FIG. 1B, each set of objects compared is represented in the resultant comparison display as a separate tree structure, 70 and 72. Thus, in conventional comparison methods, the screen real-estate, or space, necessary for displaying the comparison results is generally large. As a result, it is difficult to display additional information relative to the comparison and/or objects involved therein along with the results of the comparison, for lack of screen space.

Thus, it is desirable to have a comparison process that informs the user of the results of the comparison as they became available; i.e., in real time, as they are generated. It is also desirable to have a comparison process in which the user can control, or otherwise determine, the order of the items compared. Further, it is desirable to have a comparison method that displays the results of a comparison in a more user-friendly manner. Too, it is desirable to have a comparison method that displays the results of the comparison in a more horizontally compact manner, in order to accommodate the display of additional information therewith.

SUMMARY OF THE INVENTION

The invention comprises methods and graphical user interfaces for comparing collections, or sets, of objects, or items. The invention can be used generally to compare any of two or more sets of objects, including, but not limited to, the contents of two or more computer directories, the contents of two or more folders in a computer directory, two or more files in two or more databases and two sets of objects from one or more databases.

In an aspect of one embodiment, a tree is generated with representative nodes for the object types and respective objects of the sets of objects to be compared. An object view of the tree, representing a graphical user interface representation of the tree, is displayed to the user. The displayed object view generally takes up minimum horizontal space on a display device as a single displayed tree of an object view represents all the objects of all the object types requested to be compared that are in the sets of objects being compared.

In another aspect of an embodiment, a user may choose the order in which object pairs are compared. In an embodiment, results of the comparison of respective object pairs are reported to the user in real time, i.e., as they are generated. Thus, the user can determine the order of the comparison and the order of reported results for the comparison.

In an embodiment, a result view is generated. A result view comprises a generated tree having representations of the results of the comparisons of respective object pairs, as they are compared. A result view of the tree, representing a graphical user interface representation of the tree, is thereafter displayed to the user. In an embodiment, the result view also comprises representations indicating which object pairs have been compared, which have not yet been compared, and the object pair that is currently being compared.

In an embodiment, a detail view can be displayed, along with a respective result view, to the user. A detail view provides detailed information on an object, or object pair, in the set of objects being compared.

Other and further objects, features, aspects and advantages of the present invention are found in the detailed description of the preferred embodiments and the accompanying drawings.

BRIEF DESCRIPTION OF THE ACCOMPANYING DRAWINGS

DETAILED DESCRIPTION OF THE PREFERRED EMBODIMENTS

In the following description, for purposes of explanation, numerous specific details are set forth in order to provide a thorough understanding of the present invention. It will be apparent, however, to one skilled in the art, that the present invention may be practiced without these specific details. In other instances, well-known structures and devices are shown in block diagram form in order to avoid unnecessarily obscuring the present invention.

Dynamic Comparison Apparatus and Methodology

Figure 3:
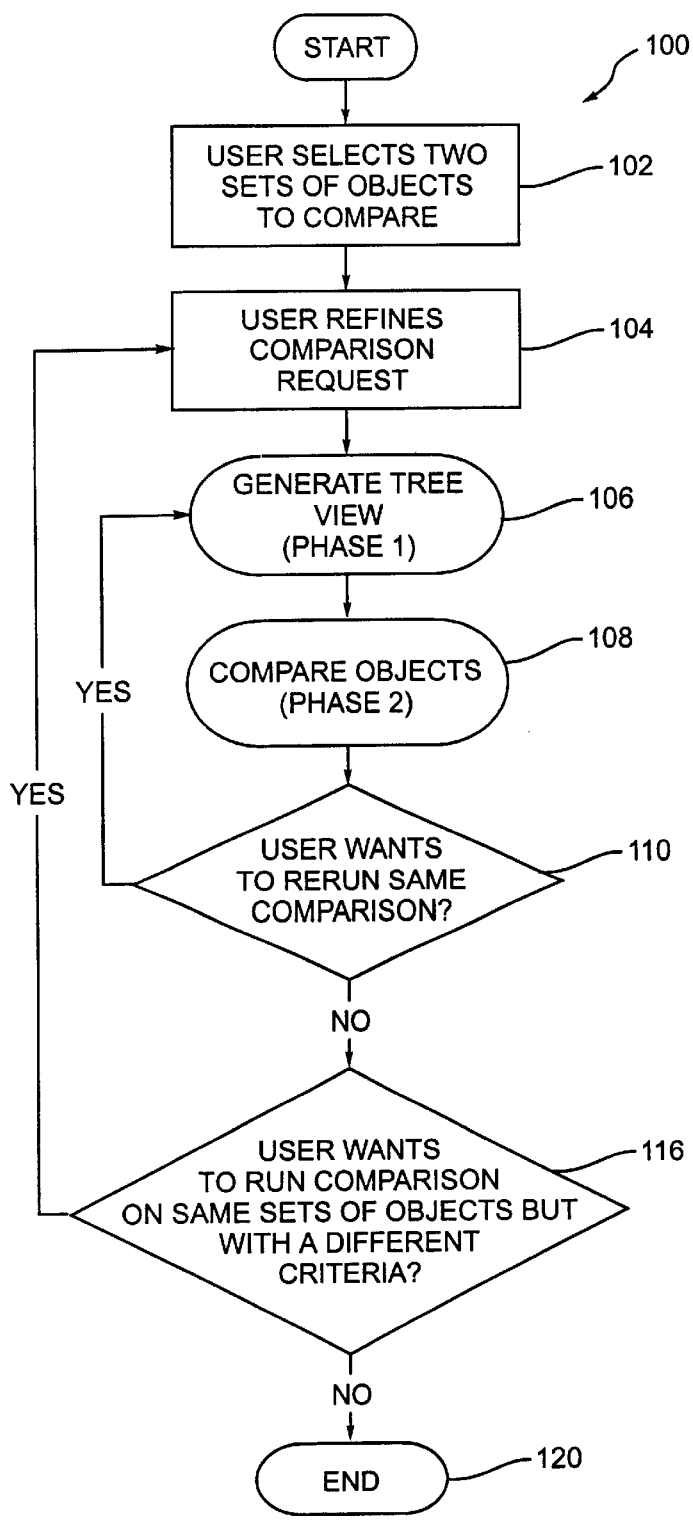
FIG. 3 depicts the process flow for an embodiment of a dynamic comparison method according to the invention.

In an embodiment of a dynamic comparison process 100, as shown in the process flowchart of FIG. 3, the user selects two sets, or collections, of objects to be compared (102). In an alternative embodiment, the user may select three or more sets of objects to be compared at a time.

Figure 4:
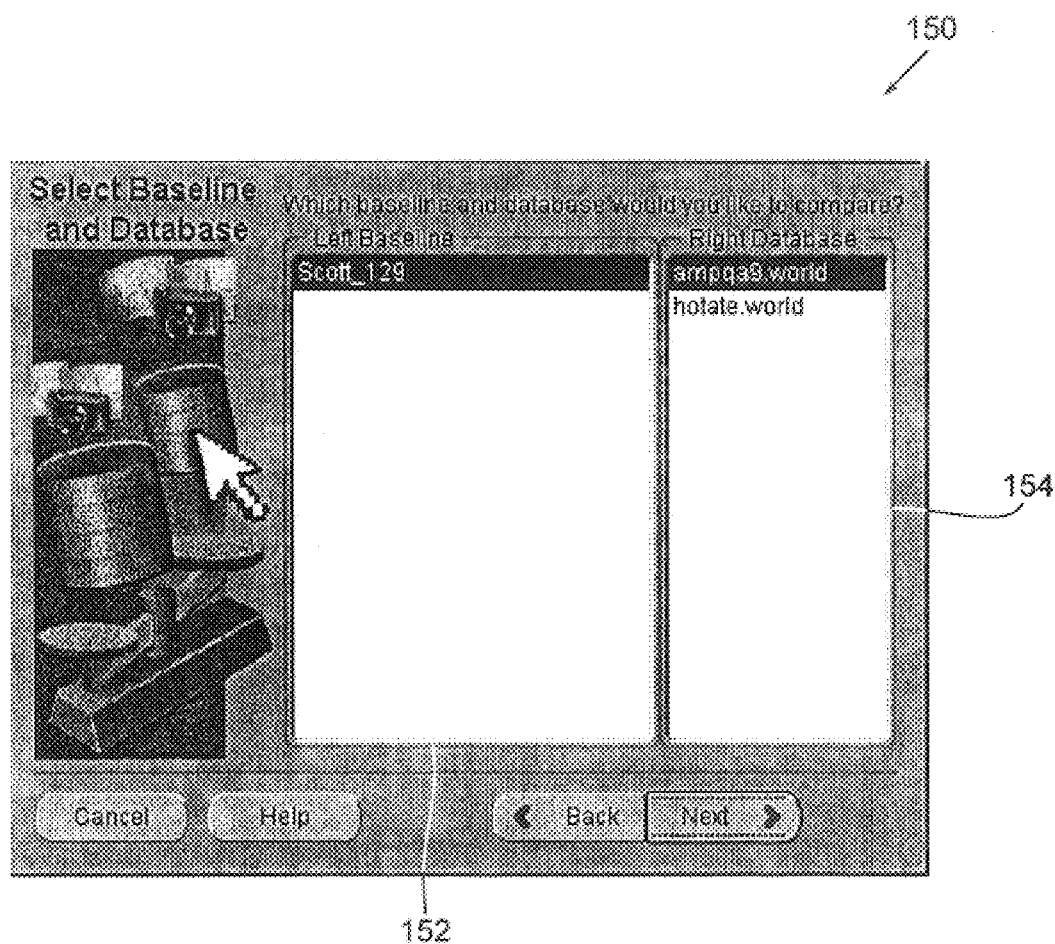
FIG. 4 is an embodiment of a graphical user interface (GUI) screen for selecting sets of objects to be compared.

An embodiment of a graphical user interface (GUI) screen 150 for selecting two sets of objects to compare, as shown in FIG. 4, directs the user to select the two respective sets of objects to be compared. In an embodiment, the first, or "Left Baseline," or simply left source, set of objects 152 is the baseline set of objects of the comparison. In this embodiment, the second, or "Right Database," or simply right source, set of objects 154 is the set of objects compared to the first, or baseline, set of objects 154.

In an alternative embodiment, where three or more sets of objects are chosen to be compared, the first set of objects is the baseline and all the other sets of objects are compared to the first, baseline, set of objects.

In an embodiment, the objects from the two sets of objects 152 and 154 to be compared can be derived, or otherwise obtained, from one of two sources. The first source for objects to be compared comprises files, directory structures, and system data maintained on a computer system. For a comparison of database objects, the sources of objects to be compared comprises database schemas, users, profiles and tablespaces.

A database schema is a collection of objects. Schema objects include, but are not limited to, e.g., tables, views, sequences and stored procedures.

Tables are generally the basic unit of organization in a relational database; tables comprise data stored in respective rows and columns. Views are custom-tailored presentations of data in one or more tables. Views derive their data from tables on which they are based, i.e., base tables. Base tables, in turn, can be tables, or can themselves be views. An example of a view is a table minus two of the columns of data of the table.

Sequences are serial lists of unique numbers identifying numeric columns of one or more database tables. Sequences generally simplify application programming by automatically generating unique numerical values for the rows of a single table, or multiple tables. With the use of sequences, more than one user may enter data to a table at generally the same time. For example, if two users are creating new employee records in a table simultaneously, the respective sequence can generate the employee number for each record for each user, without either user having to wait for the other to input the next available employee number into their respective record.

A stored procedure is generally a set of computer statements grouped together as an executable unit to perform a specific task.

As previously noted, the first source for objects of the two sets of objects 152 and 154 to be compared comprises database schemas, users, profiles and tablespaces. Users are those who access a respective database. Associated with each user of a database is a schema, i.e., a collection of objects, of the same user name. Each user of a database is also assigned a profile. A user profile specifies the limitations on several system resources available to the respective user, including, but not limited to, e.g., the number of concurrent sessions the user may establish, the CPU processing time available to the user's session, the amount of logical input/output (I/O) available to the user's session, the allowed amount of idle time for the user's session, and the allowed amount of connect time for the user's session.

A tablespace is a logical storage unit for a portion of a database; i.e., a database is generally divided into logical units or tablespaces. A tablespace is used to group related logical structures together. For example, tablespaces may group all of an application's objects, to simply operations thereon.

The second source for objects of the two sets of objects 152 and 154 to be compared is an earlier created baseline of objects. In the context of a comparison of database objects, a baseline is generally a previously-captured state of a schema or database.

Thus, in an embodiment, the user can choose to compare objects in one schema or database to the objects in a second schema or database. The user can also choose to compare the objects in a schema or database to a previously-captured state, i.e., baseline, of the same schema or database. Too, the user can choose to compare the objects in one baseline to the objects in another baseline.

In a more general embodiment, a user can compare any two sets of objects, including, but not limited to, e.g., respective directories on two drives, e.g., the C and D drives, of a computer, one or more files in one or more databases, and one or more files in one or more folders of a computer directory.

Figure 5:
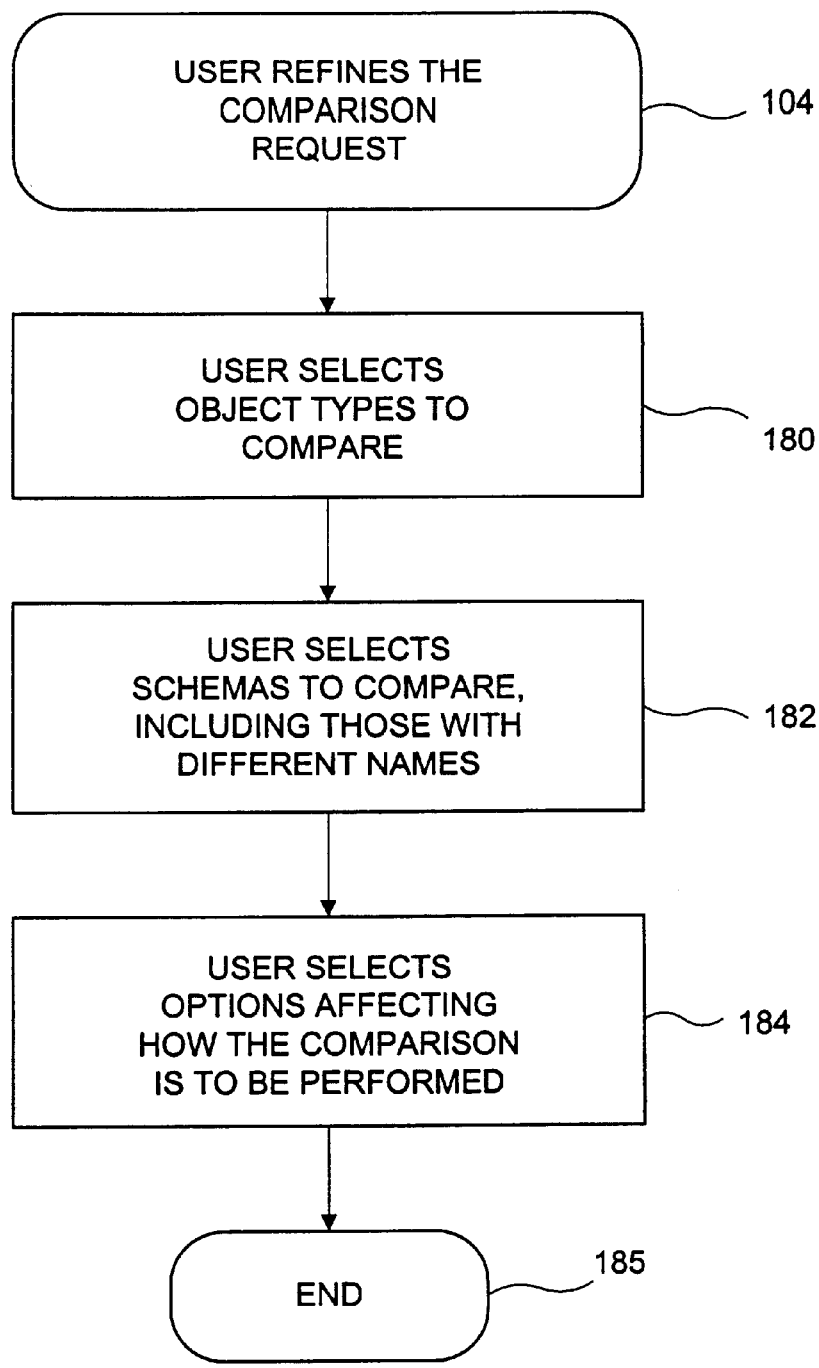
FIG. 5 is an embodiment of a process for allowing a user to refine a comparison request.

Referring again to FIG. 3, in an embodiment, the user, after selecting 102 two sets of objects to compare, is requested to refine, or more specifically identify or describe, the comparison request (104). An embodiment of a comparison request refinement procedure is shown in more detail in FIG. 5. Initially, the user is requested to select the object types to be compared (180). In an embodiment, the user is also requested to select one or more schemas to be compared (182). By default, schemas with the same name in each of the sets of objects to be compared are chosen to be compared. The user may also, in the alternative, identify schemas to be compared that do not have the same name in each of the sets of objects to be compared.

In an embodiment, the user is also requested to select options affecting how the comparison is to be performed (184).

Figure 6:
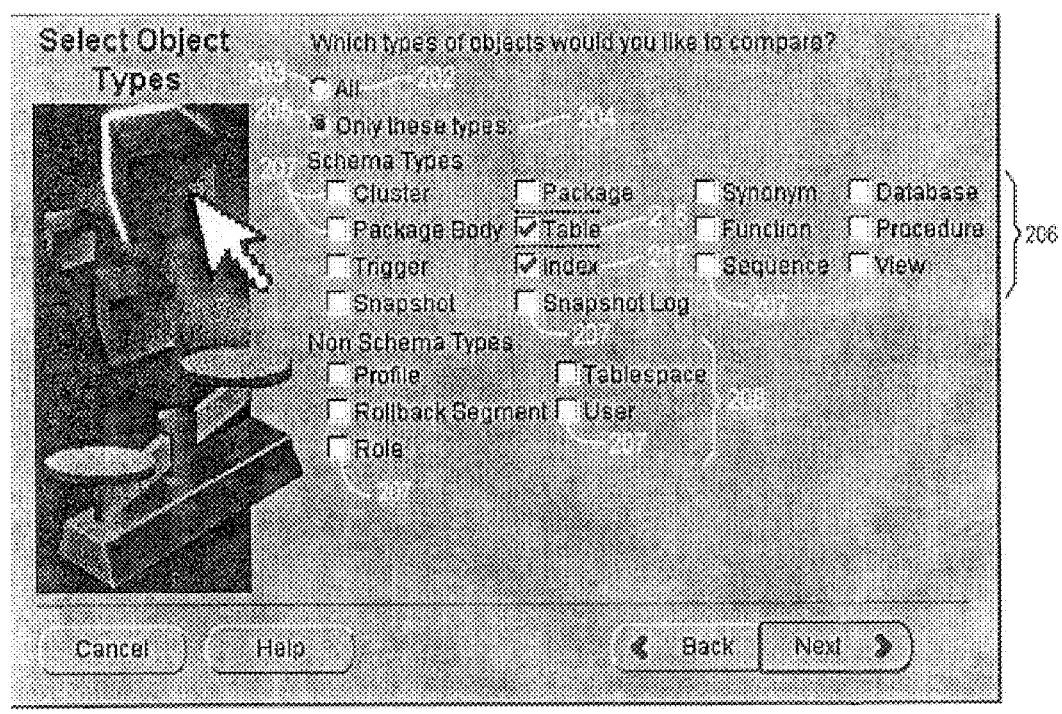
FIG. 6 is an embodiment of a GUI screen for selecting the types of objects to be compared.

An embodiment of a graphical user interface (GUI) screen 200, as shown in FIG. 6, allows the user to select the object types in the two sets of objects to be compared (180). More specifically, the GUI screen 200 provides the user the option to choose to compare all object types in both sets of objects (202). Alternatively, the GUI screen 200 provides the user the option to select one or more, but less than all, object types in the sets of objects to be compared (204).

To compare all object types in both sets of objects to be compared (202), the user can select the GUI button 203 associated with the all object type selection choice. Likewise, to compare less than all object types in the sets of objects to be compared (204), the user can select the GUI button 205 associated with the less than all object type selection choice.

If the user chooses to compare less than all object types 204, they must select one or more schema object types 206 and/or one or more non-schema object types 208 to be compared. In an embodiment, the schema object types 206 that a user can request comprises clusters, package bodies, triggers, snapshots, packages, tables, indexes, snapshot logs, synonyms, functions, sequences, databases, procedures and views.

Figure 7:
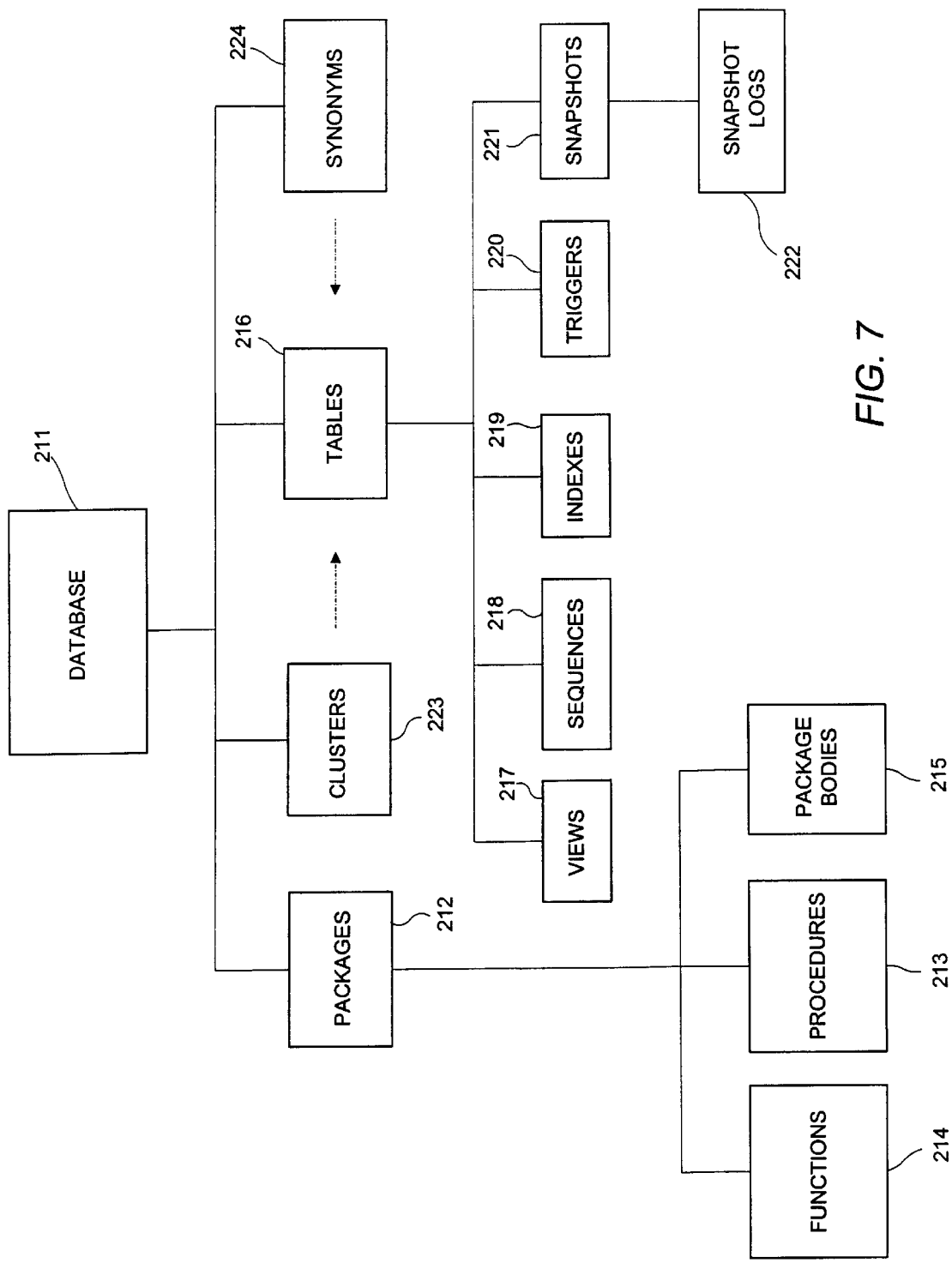
FIG. 7 is a block diagram of exemplary schema type objects that can be compared.

A generalized relationship of the various database schema object types, as shown in FIG. 7, indicates that a database 211 may comprise packages 212, clusters 223, tables 216 and synonyms 224. A database is a collection of various schema objects.

As previously described, tables 216 are a basic unit of organization in a relational database; tables comprise data stored in respective columns and rows. Views 217 are custom-tailored presentations of data in one or more tables 216. Sequences 218 are serial lists of unique numbers identifying numeric columns of one or more tables 216.

Indexes 219 are optional structures associated with tables 216; an index 219 is generally created to increase the performance of data retrieval from a respective database 211. Indexes 219 are generally akin to indexes of a book; they help a user locate specific information in a database 211 more quickly. Indexes 219 are created on one or more columns of a table 216; however, an index 219 is physically and logically independent of the data in the respective table 216.

Triggers 220 are procedures, i.e., a collection of computer statements, that are automatically executed as a result of an insert in, update to, or delete from a respective table 216. Triggers 220 are used in a variety of ways for information management of a database 211, including, but not limited to, e.g., automatic data generation and data modification audits.

Snapshots 221 are read-only copies of a table 216, i.e., a master table. A snapshot 221 can be read, but not updated; only the underlying master table 216 can be updated. A snapshot 221 is periodically refreshed to reflect changes made to the underlying master table 216.

A snapshot log 222 is a table in the database 211 that is associated with a master table 216, from which a snapshot 221 has been created. A respective snapshot log 222 is used to track the rows that have been updated in the underlying master table 216. A snapshot log 222 is used to refresh the respective snapshot 221.

Clusters 223 are an optional method of storing table data. Clusters 223 are groups of one or more tables 216 that are physically stored together because they share common columns and are often used together.

Synonyms 224 are alias structures. A synonym 224 is an alias for a table 216, view 217, sequence 217 or program unit, i.e., stored procedures 213, functions 214, and/or packages 212. A synonym 224 is not actually an object itself, but instead, is a direct reference to an object. Synonyms 224 are used for purposes including, but not limited to, e.g., masking the real name and owner of an object, providing public access to an object, and providing location transparency for tables 216, views 217 or program units of a remote database.

Packages 212 provide a method of encapsulating and storing related procedures 213 and functions 214 together as a unit in a database 211. A package 212 is generally created in two parts: the specification and the body 215. Package specifications (not shown) declare all the public constructs of the respective package 212. Package bodies 215 define all constructs, public and private, of the respective package 212.

Procedures 213 are generally sets of computer statements grouped together as an executable unit to perform a specific task. Functions 214 are identical to procedures 213, except that functions 214 always return a value to the caller, while procedures 213 do not return a value to the caller.

Referring again to FIG. 6, in an embodiment, the non-schema object types 208 that a user can request in a comparison comprise profiles, rollback segments, roles, tablespaces and users.

Figure 8:
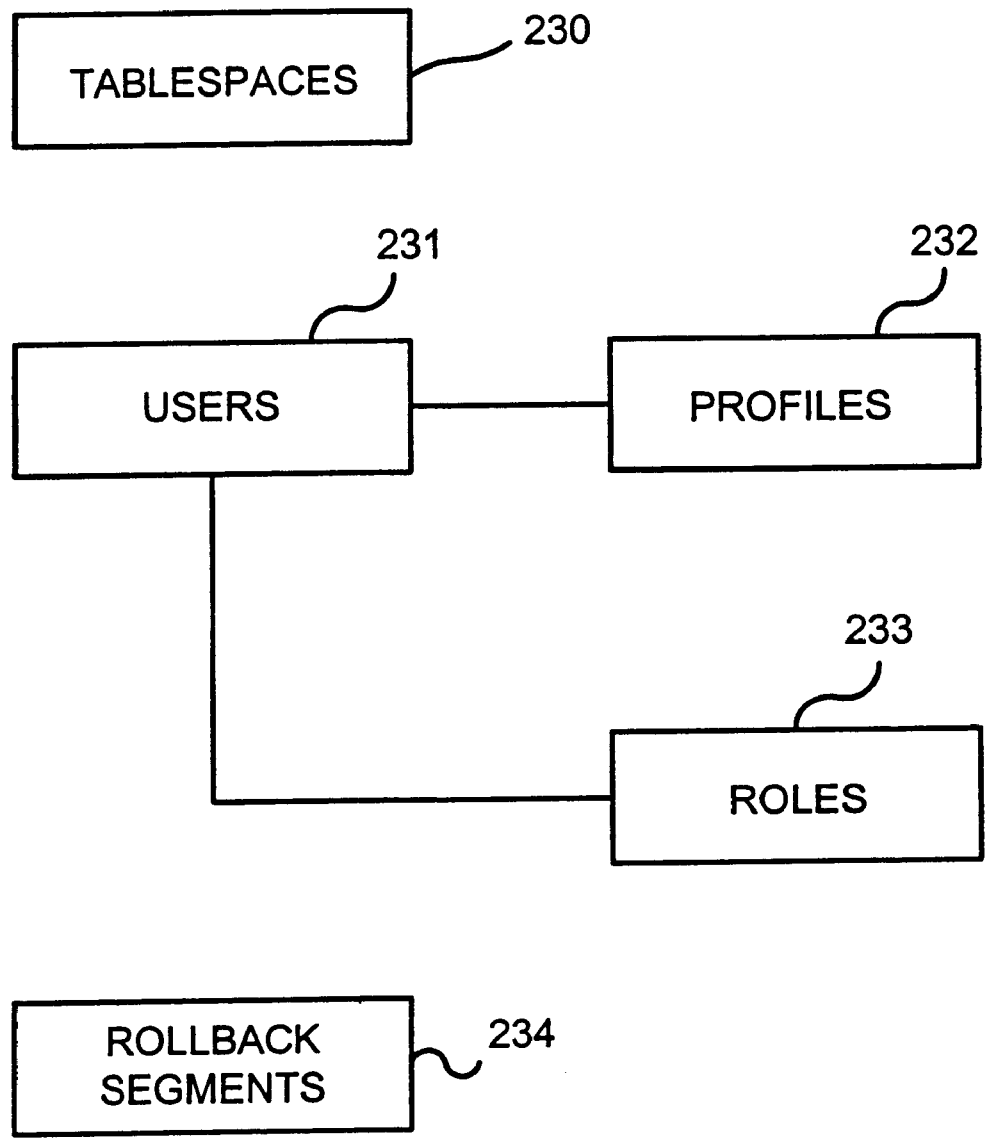
FIG. 8 is a block diagram of exemplary non-schema type objects that can be compared.

In an embodiment, the non-schema types that can be included in a comparison, generally shown in FIG. 8, include tablespaces 230, which, as previously described, are logical storage units for portions of a database; i.e., a database is generally divided into logical storage units or tablespaces 230.

As also previously described, users are those who access a respective database. Associated with each user of a database is a schema, i.e., a collection of objects, of the same user name, also denoted a user 231. Each user of a database is also assigned a profile 232. Profiles 232 are generally files that specify the limitations on several system resources available to the respective user.

Roles 233 are named groups of related privileges that are granted to users, or other roles 233. Privileges of a role 233 are granted to users so that the users can access and modify data in a database. A privilege is generally a right to execute a particular type of computer statement, and can include, without being limited to, e.g., the right to connect to a particular database, the right to create a table in a schema, the right to select rows from a table created by another, and the right to execute a procedure generated by another.

Rollback segments 234 are sets of various contiguous data blocks for temporarily storing "undo" information. "Undo" information is used for generating read-consistent database information, during a database recovery, and to rollback, or otherwise undo, uncommitted user transactions, i.e., changes to a database.

In the exemplary graphical user interface (GUI) screen 206 of FIG. 6, the user has chosen to compare only specific object types in the two sets of objects to be compared. More specifically, in the exemplary GUI screen 206, the user chose to compare tables 216 and indexes 217 in the two sets of objects to be compared.

In an embodiment, a user's selection of one or more schema object types 206 and/or one or more non-schema object types 208 is indicated by a checkmark in the respective object types' GUI button 207.

Figure 9:
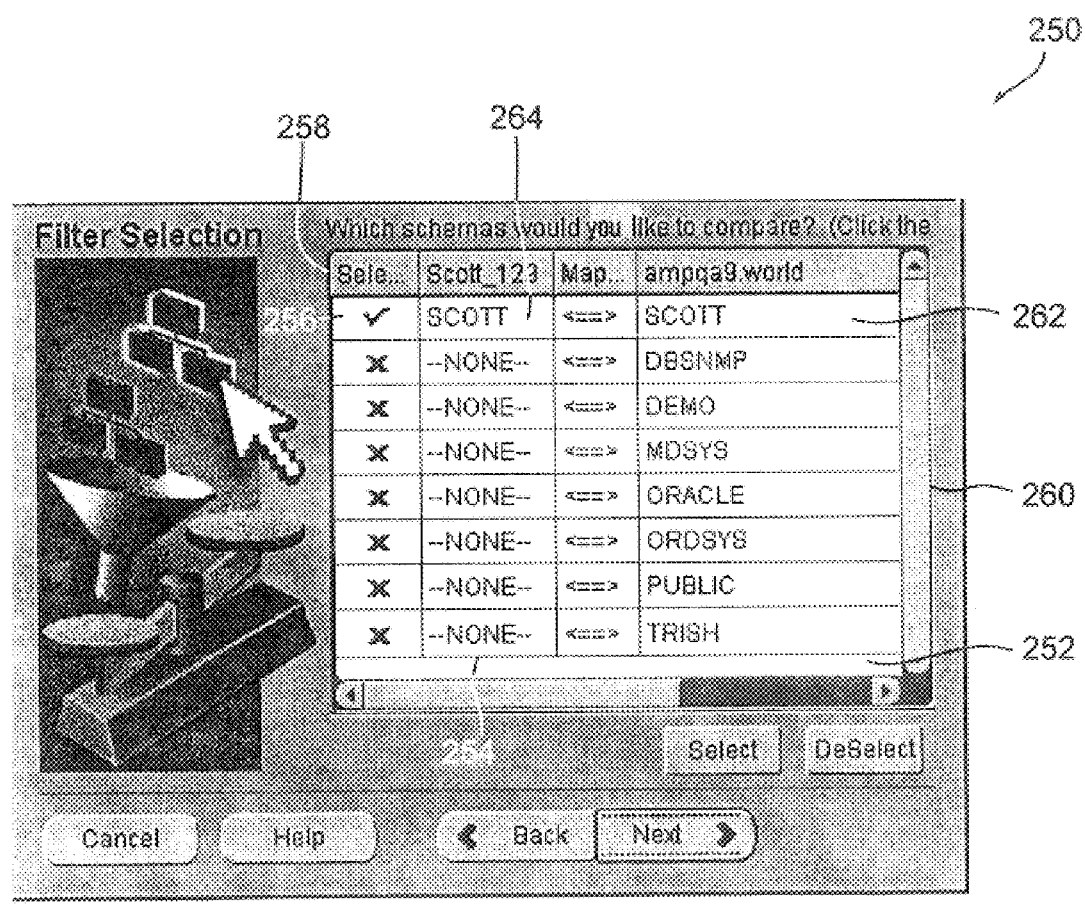
FIG. 9 is an embodiment of a GUI screen for selecting schemas to compare.

An embodiment of a GUI screen 250 for allowing a user to select the schemas to be compared (182), as shown in FIG. 9, lists the schemas available in both sets of objects to be compared. As shown in exemplary GUI screen 250, all the schemas in the SCOTT_129 database, or baseline, 254 and all the schemas in the ampqa9.world database, or baseline, 252 are listed in a schema option table 260. In an embodiment, the user can select one or more schemas from each set of objects to be compared. A schema from each of the sets of objects that is to be compared comprises a schema pair.

In the exemplary GUI screen 250, the user has chosen to compare the set of objects in schema SCOTT 262 in the ampqa9.world database, or baseline, 252 against the set of objects in schema SCOTT 264 in the Scott_129 database, or baseline, 254. This is indicated by the checkmark 256 under the "Sele . . . " column 258 in the schema option table 260.

Referring again to FIG. 3, once the user refines the comparison request (104), the dynamic comparison process 100 executes a generate tree view process (106). The execution of the generate tree view process (106) comprises Phase 1 of the dynamic comparison process 100.

Generally, the generate tree view process generates a tree with a representative node for each of the object types requested to be compared, i.e., designated object types, for each schema pair to be compared, and for each object of a designated object type to be compared. A graphical representation of the tree, i.e., an object view, is thereafter displayed on a display device to the user.

Figure 10:
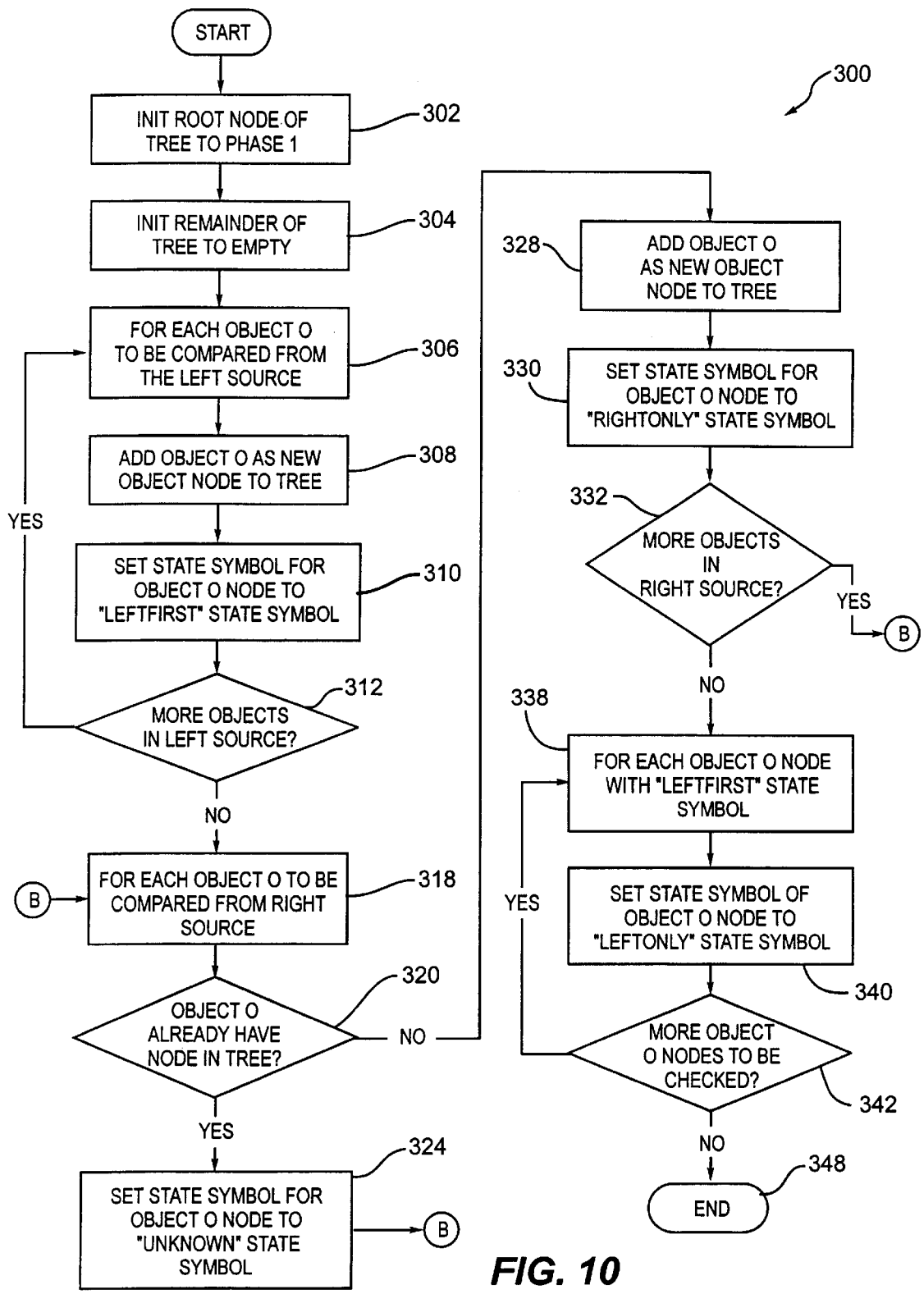
FIG. 10 is an embodiment of a generate tree view, or Phase 1, method according to the invention.

In an embodiment, a generate tree view process 300, as shown in FIG. 10, initializes a root node of a tree to Phase 1 (302). The remainder of the tree is initialized to empty (304). The tree of a respective comparison is a graphical representation of information on the objects of the designated object type(s) in the sets of objects being compared. The tree of a respective comparison is thereafter updated to represent comparison results, as they are generated, as further discussed below.

The generate tree view process 300 loops through each object O of a designated object type from the left source, i.e., the first set of objects to be compared (306). For example, if the user requested that only tables and indexes be compared, the designated object types would be tables and indexes. The generate tree view process 300 would then process each table type object and each index type object in the left source.

As another example, if the user requested all object types be compared, the designated object types would include all possible schema and non-schema object types. The generate tree view process 300 would then process each schema object type object and each non-schema object type object in the left source.

In an embodiment, the objects O in the left source are processed serially. For each object O in the left source that is looped through, i.e., processed, the generate tree view process 300 adds a new node to the tree, representative of the respective object O (308). In an embodiment, the object node is named the unqualified name of the respective object O.

Figure 11A:
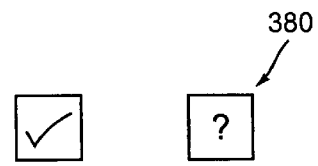
FIGS. 11A, 11B, 11C, 11D, 11E and 11F are exemplary state symbols.

For each object O in the left source that is added as a node to the tree (308), the generate tree view process 106 sets a node symbol for the respective object node to a "leftFirst" state symbol (310). An embodiment of a "leftFirst" state symbol 380, as depicted in FIG. 11A, shows that the respective object O exists in the left source, as indicated by the checkmark in the left-side box. The "leftFirst" state symbol 380 also shows that, at the time, it is uncertain whether a corresponding object exists in the right source, i.e., in the second set of objects being compared, as indicated by the question mark in the right-side box.

The generate tree view process 300 thereafter checks whether there are more objects O in the left source to be processed (312). If yes, the generate tree view process 300 loops to the next object O of a designated object type in the left source (306). If no, the generate tree view process 300 loops through, i.e., processes, each object O of a designated type in the right source, i.e., in the second set of objects to be compared (318).

Figure 11B:
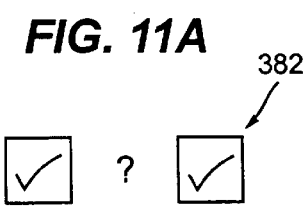

In an embodiment, the objects O in the right source are processed serially. For each object O from the right source that is processed, the generate tree view process 300 checks whether the object O already has a respective tree node (320). If yes, the generate tree view process 300 resets the node symbol for the respective object node to a "unknown" state symbol (324). An embodiment of a "unknown" state symbol 382, as depicted in FIG. 11B, shows that the respective object O exists in the right source, as indicated by the checkmark in the right-side box. The "unknown" state symbol 382 also shows that a corresponding object exists in the left source, as indicated by the checkmark in the left-side box. Further, "unknown" state symbol 382 shows that, at the time, it is uncertain whether the corresponding objects O, or object O pair, are equivalent or not, as indicated by the question mark between the left-side box and the right-side box.

If the object O in the right source currently being processed by the generate tree view process 300 does not have a respective object node in the tree, the generate tree view process 300 adds a new node, i.e., an object O object node, to the tree (328). In an embodiment, the object node is named the unqualified name of the object O.

Figure 11C:
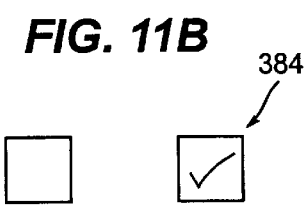

For each object O in the right source that has a corresponding object node added to the tree (328), the generate tree view process 300 sets the node symbol to a "rightOnly" state symbol (330). An embodiment of a "rightOnly" state symbol 384, as depicted in FIG. 11C, shows that the respective object O exists in the right source, as indicated by the checkmark in the right-side box. The "rightOnly" state symbol 384 also shows that there is no corresponding object in the left source, as indicated by the empty left-side box.

The generate tree view process 300 thereafter checks whether there are more objects O in the right source to be processed (332). If yes, the generate tree view process 300 loops to the next object O of a designated object type in the right source (318).

Figure 11D:
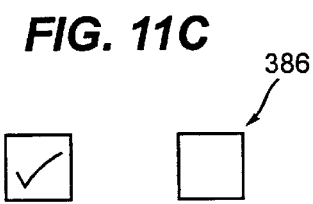

If no, i.e., all objects of a designated object type in the right source have been processed, the generate tree view process 300 loops through each object node with a "leftFirst" state symbol 380 (338). For each object node in the tree with a respective "leftFirst" state symbol 380, the generate tree view process 300 resets the node symbol to a "leftOnly" state symbol (340). An embodiment of a "leftOnly" state symbol 386, as depicted in FIG. 11D, shows that the respective object O exists in the left source, as indicated by the checkmark in the left-side box. The "leftOnly" state symbol 386 also shows there is no corresponding object in the right source, as indicated by the empty right-side box.

The generate tree view process 300 checks whether there are more object nodes with respective "leftFirst" state symbols 380 to be processed (342). If yes, the generate tree view process 300 loops to process the next one. If, however, there are no remaining object nodes with a "leftFirst" state symbol 380, the generate tree view process 300 ends (348).

The generate tree view process 300 also adds a object type node for each respective designated object type to the tree (not shown). Too, the generate tree view process 300, adds a schema node for each respective schema pair to the tree (also not shown). Object types and schemas are particular embodiments of folders, or containment levels, in a containment hierarchy such as, but not limited to, a computer file or directory system. Thus, in an embodiment, the designated object type nodes, i.e., the tree nodes for object types to be compared, are depicted as folders. Too, in an embodiment, the schema pair nodes, i.e., the tree nodes for the schemas from each of the sets of objects to be compared, are also depicted as folders.

In an embodiment, all tree nodes are grouped under the root node. For non-schema type objects, their object nodes are grouped under the respective object type node. For schema type objects, their object nodes are grouped under respective schema nodes, which, in turn, are grouped under respective object type nodes.

All object nodes of the tree are grouped under respective schema nodes, if applicable. Otherwise, if non-schema type objects are being compared, the object nodes are grouped under the respective object type node. All schema nodes, in turn, are grouped under respective object type nodes.

The end of the processing of the generate tree view process 300 marks the end of Phase 1 of the dynamic comparison process 100. At this time, a complete tree has been generated with respective nodes, i.e., object nodes, schema nodes and object type nodes, indicative of the objects in each of the sets of objects being compared. The tree also includes node symbols corresponding with each object node indicative of whether the object of the respective object node exists in one, or the other, or both sets of objects being compared.

Figure 12:
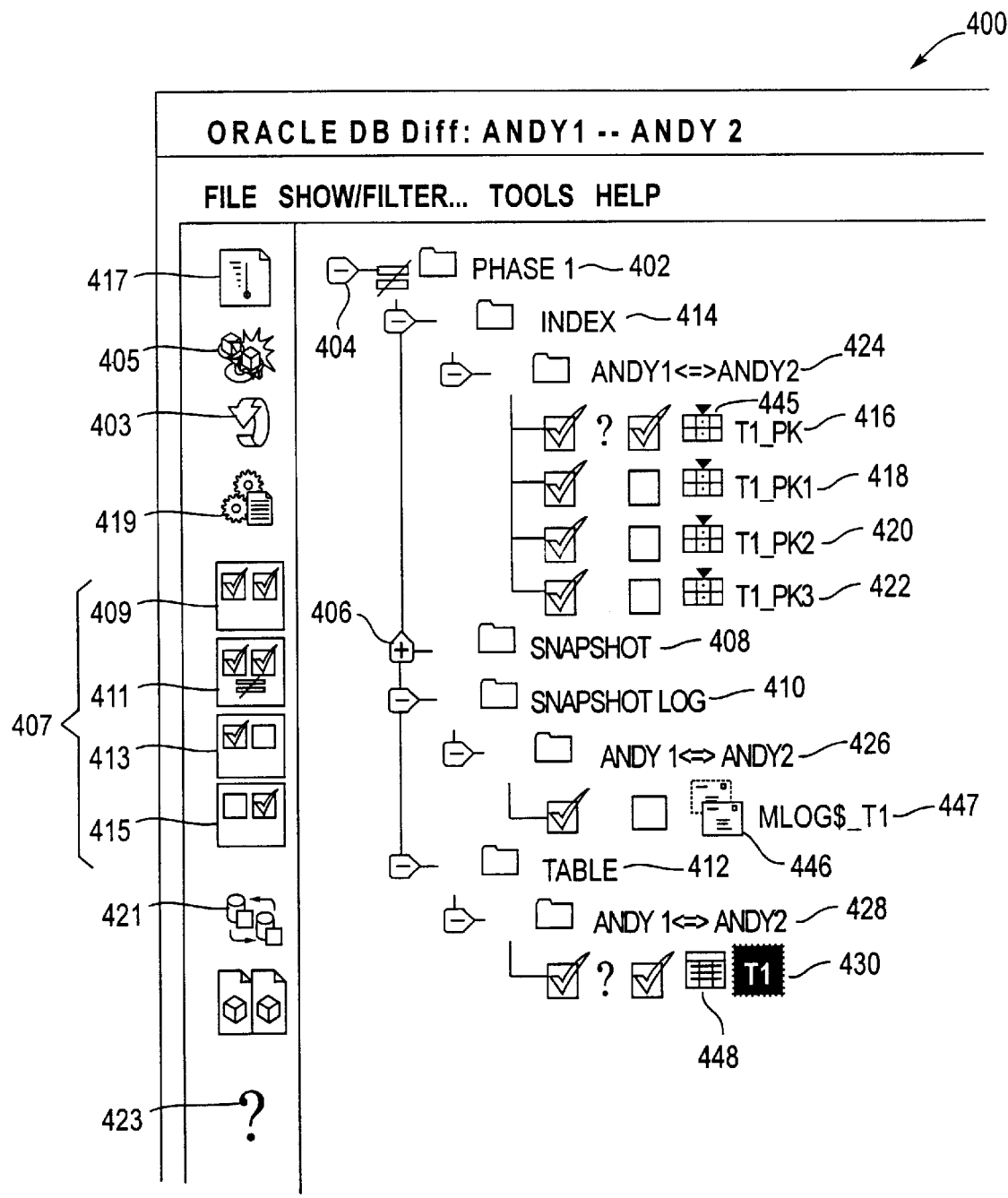
FIG. 12 is an embodiment of a GUI screen for a Phase 1 object view.

An exemplary object view, i.e., an exemplary graphical representation of a tree 400, as shown in FIG. 12, is the resultant of Phase 1, and the generate tree view process 300. The root node 402 has been initialized, and remains set to Phase 1 at this time. Under the root node 402 is an object type node for each designated schema object type and each designated non-schema object type; i.e., for each schema and non-schema object type included in the comparison. In exemplary tree 400, there is an object type node 414 for index type objects, an object type node 408 for snapshot type objects, an object type node 410 for snapshot log type objects and an object type node 412 for table type objects.

In tree 400, under each applicable object type node are schema nodes 424, 426 and 428. Tree 400 indicates that index type objects in schema ANDY1 are to be compared to index type objects in schema ANDY2. Also, snapshot log type objects in schema ANDY1 are to be compared to snapshot log type objects in schema ANDY2. Too, table type objects in schema ANDY1 are to be compared to table type objects in schema ANDY2.

In tree 400, under each applicable schema node are object nodes for the objects of the respective schemas of the designated object types in the left and/or right source to be compared. For example, in tree 400, there is an object node 416 for a T1_PK object, an object node 418 for a T1_PK1 object, an object node 420 for a T1_PK2 object and an object node 422 for a T1_PK3 object. Each object of the respective object nodes 416, 418, 420 and 422 are index object types. There are no more index type objects in schema ANDY1 or schema ANDY2, as there are no more object nodes under the index object type node 414.

The minus symbol 404 associate with the root node 402 indicates that the root node is expanded. An expanded node means that the node is expanded to show all its related sub-nodes. For example, if the root node 402 is expanded, then all the object type nodes of the tree are displayed.

In an embodiment, both object type nodes and schema nodes are considered container nodes. If a container node is expanded, then its sub-nodes are displayed. For example, if an object type node is expanded for a respective schema object type, the schema nodes for the schema pairs of that object type will be displayed. As another example, if an object type node is expanded for a respective non-schema object type, the object nodes for the objects of that object type will be displayed. As a final example, if a schema node is expanded for a respective schema pair, the object nodes for the objects of that schema pair will be displayed.

In exemplary tree 400, the root node 402 is expanded, as indicated by the minus symbol 404 associated therewith, to show the index object type node 414, the snapshot object type node 408, the snapshot log object type node 410 and the table object type node 412.

To collapse a tree node, thereby hiding, or otherwise not displaying, in the object view, its related sub-nodes, a user can select the minus symbol 404 associated with the respective node. The minus symbol 404 is changed to a plus symbol 406, and the resultant object view of the tree depicts only the collapsed root or container node associated with the plus symbol 406, and none of its sub-nodes.

In tree 400, the snapshot node 408 has been collapsed, as indicated by the respective plus symbol 406 associated with it. Thus, the contents of, or its respective sub-nodes, i.e., the schema node(s) for the snapshot type schema pairs, and the object nodes for the snapshot type objects, if any, are not shown in the object view of the tree.

To expand a tree node, thereby displaying all its sub-nodes, if any, a user can select the plus symbol 406 associated with the respective tree node. The plus symbol 406 is changed to a minus symbol 404, and the object view of the tree depicts the sub-node(s), if any, associated with the expanded root or container tree node.

In exemplary tree 400, the index object type node 414 is expanded, as indicated by the minus symbol 404 associated with it. The sub-nodes of the index object type node 414, i.e., the schema node for the schema pair of the index object type to be compared, is displayed in the object view, under the expanded index object type node 414. Thus, in the present object view of tree 400, the schema node 424 for the ANDY1-ANDY2 schema pair is displayed.

In tree 400, the schema node 424 for the ANDY1-ANDY2 schema pair for index type objects is also expanded. The sub-nodes of the schema node 424, i.e., the object nodes for the index type objects and object pairs in the schema pair ANDY1-ANDY2 to be compared, are displayed in the object view, under the expanded schema node 424. Thus, in the present object view of tree 400, object nodes 416, 418, 420 and 422 are all displayed.

In exemplary tree 400, object T1__PK is an index type object in both the ANDY1 and ANDY2 schemas, as indicated by the "unknown" state symbol 382 for the respective object node 416. Further, in exemplary tree 400, object T1__PK1, object T1__PK2 and object TK__PK3 are index type objects only in the ANDY1 schema, as indicated by the "leftOnly" state symbol 386 for respective object nodes 418, 420 and 422.

If there are objects in both sets of objects to be compared of a particular schema, or non-schema, type, the corresponding objects, or object pairs, will be compared in the next phase, Phase 2, of the dynamic comparison process 100. The object view of exemplary tree 400 indicates that the index type object T1__PK exists in both the ANDY1 schema and the ANDY2 schema, and thus, the object pair T1__PK will be compared in Phase 2.

The object view of exemplary tree 400 shows that the table type object T1 exists in both the ANDY1 and ANDY2 schemas; the state symbol associated with the respective object node 430 is a "unknown" state symbol 382. Thus, the object pair T1__PK will be compared in Phase 2.

In an embodiment, for each object node, there is a corresponding graphical representation of the object type of the object or object pair represented by the object node. Referring to tree 400, an embodiment of a graphical representation of an index 445 is displayed with each object node 416, 418, 420 and 422 for the respective index type objects and object pairs. An embodiment of a graphical representation of a snapshot log 446 is displayed with the object node 447 for a snapshot type object. Too, an embodiment of a graphical representation of a table 448 is displayed with the object node 430 for a table type object pair.

At the end of Phase 1, and the generate tree view process 300, a tree with object nodes for all the objects in the two sets of objects to be compared is created and an object view of the resultant tree is displayed for the user.

Figure 14:
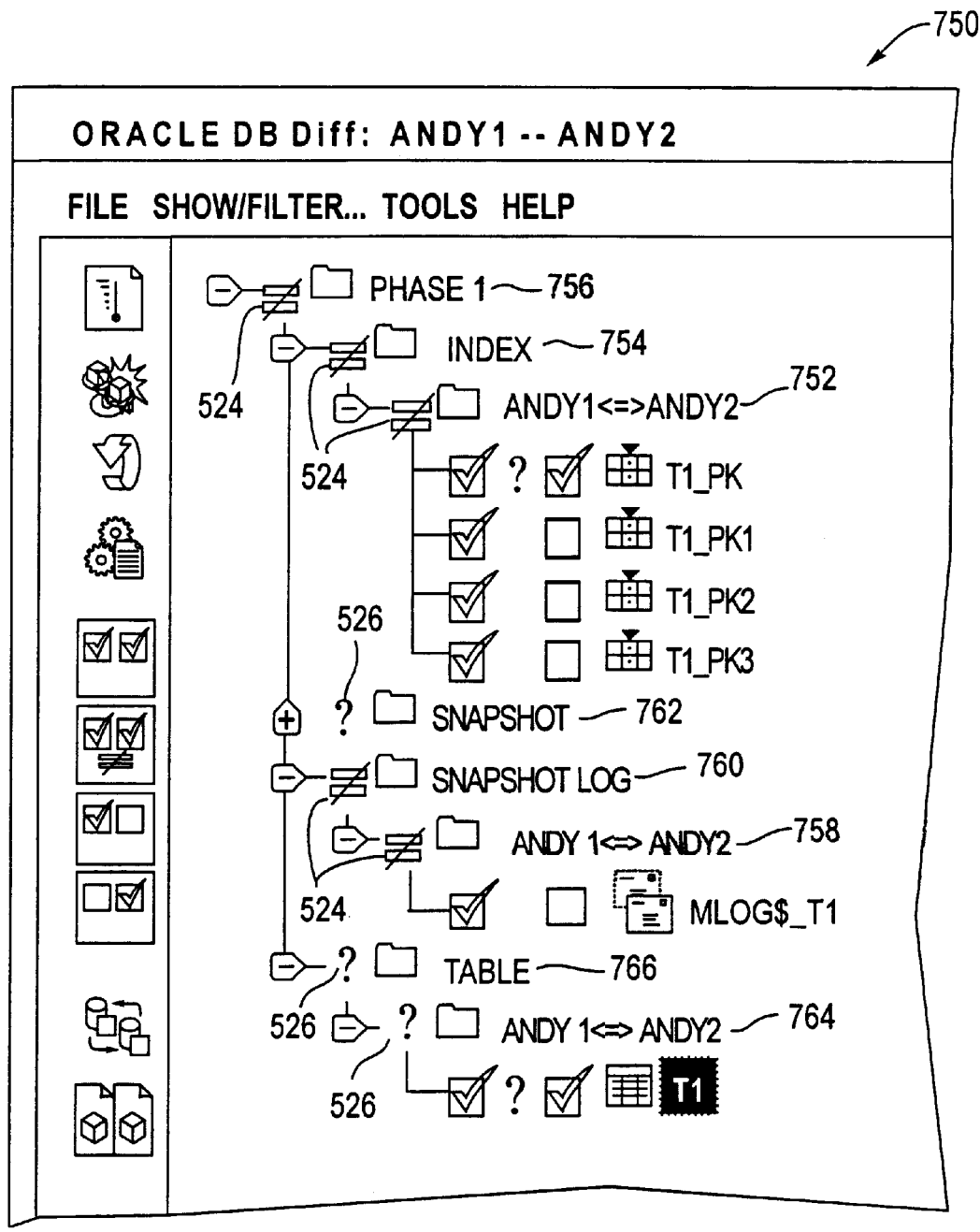
FIG. 14 is an embodiment of a GUI screen for a Phase 1 object view.

In an embodiment, status symbols are associated with every root and container node in a tree. For example, in exemplary tree 750, shown in FIG. 14, it is already known that the ANDY1 schema is not equal, or otherwise equivalent, to the ANDY2 schema for index type objects as there are three index type objects, T1__PK1, T1__PK2 and T1__PK3, that are in the ANDY1 schema but not the ANDY2 schema. Thus, in an embodiment, a "different" status symbol 524 is associated with the schema node 752 for the ANDY1-ANDY2 schema pair for index type objects. An embodiment of a "different" status symbol 524 is a not equal sign.

Further, as the ANDY1 and ANDY2 schemas for index type objects are not equal, a "different" status symbol 524 is also associated with the index object type node 754. Likewise, as the index type objects for the sets of objects being compared are not equal, a "different" status symbol 524 is associated with the root node 756.

In tree 750, it is also already known that the ANDY1 schema is not equal, or otherwise equivalent, to the ANDY2 schema for snapshot log type objects as the only object of the snapshot log type, MLOG$__T1, exists only in the ANDY1 schema, and not the ANDY2 schema. Thus, a "different" status symbol 524 is associated with the schema node 758 for the ANDY1-ANDY2 schema pair for snapshot log type objects. Further, as the ANDY1 and ANDY2 schemas for snapshot log type objects are not equal, a "different" status symbol 524 is also associated with the snapshot log object type node 760.

At this time, in the example of exemplary tree 750, it is not yet known if the object pairs of the snapshot object type are equal, or otherwise equivalent, as no comparison has yet been performed on them. Thus, in an embodiment, a "not known" status symbol 526 is associated with the snapshot object type node 762. An embodiment of a "not known" status symbol 526 is a question mark.

At this time too, in the example of exemplary tree 750, it is not yet known if the object pair T1 is equal. Thus, a "not known" status symbol 526 is associated with the schema node 764 for the ANDY1-ANDY2 schema pair for table type objects. Too, a "not known" status symbol 526 is also associated with the table object type node 766.

In an embodiment, at the end of Phase 1 no comparison has yet been performed between the object pairs to be compared; the comparison of the object pairs is performed in a second phase, Phase 2, of the dynamic comparison process 100. In an embodiment, a compare objects process 450 is executed (108) following the execution (106) of the generate tree view process 300.

Figure 13A:
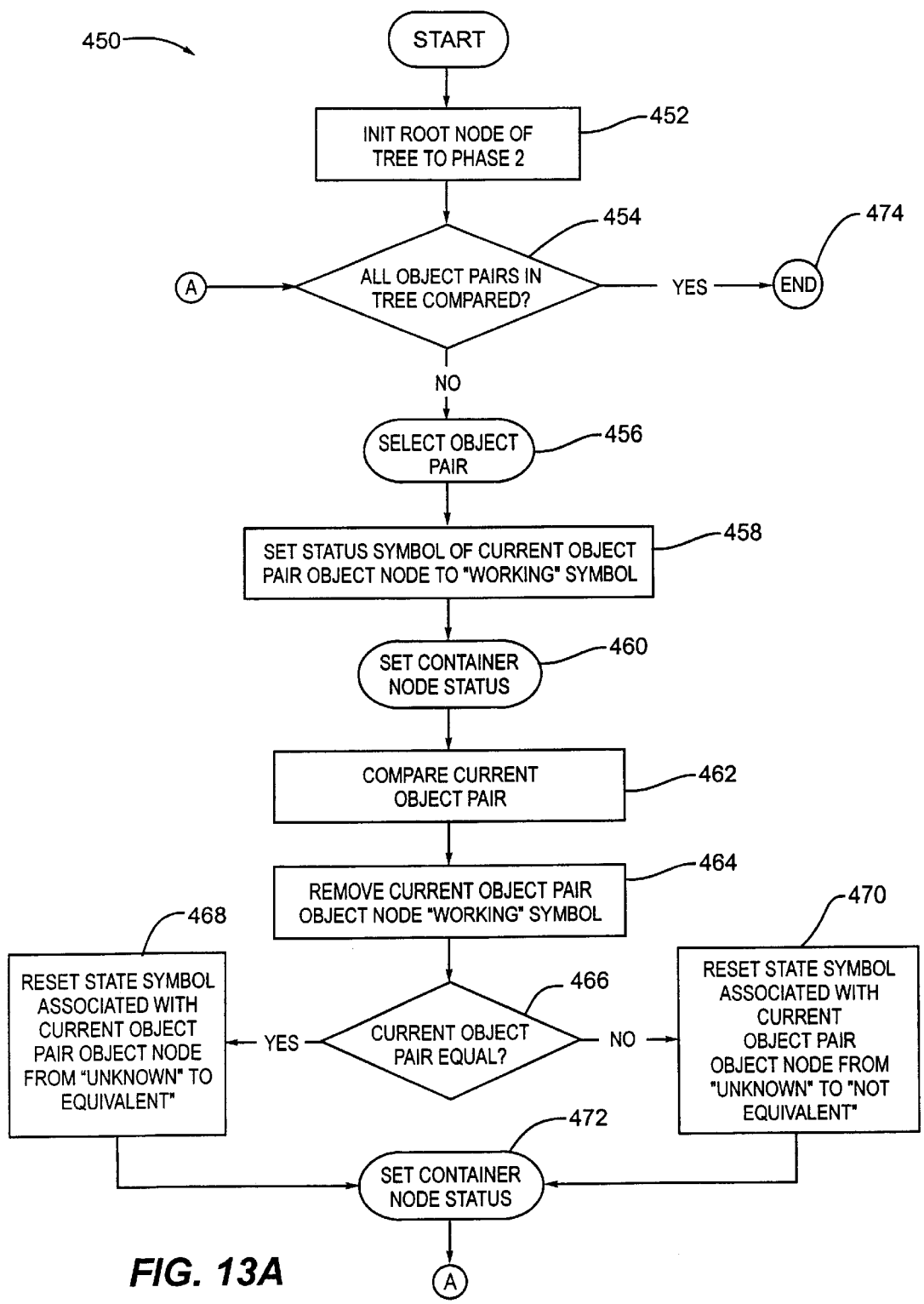
FIG. 13A is an embodiment of a compare objects, or Phase 2, method according to the invention.

In an embodiment, a compare objects process 450, as shown in FIG. 13A, initializes the root node of the tree to Phase 2 (452). A result view of the tree, with the associated status symbols therein, is displayed to the user. Thereafter, the result view displayed to the user is updated by the dynamic comparison process 100 as the tree nodes' respective state and status symbols are updated during the compare objects process 450.

Figure 15:
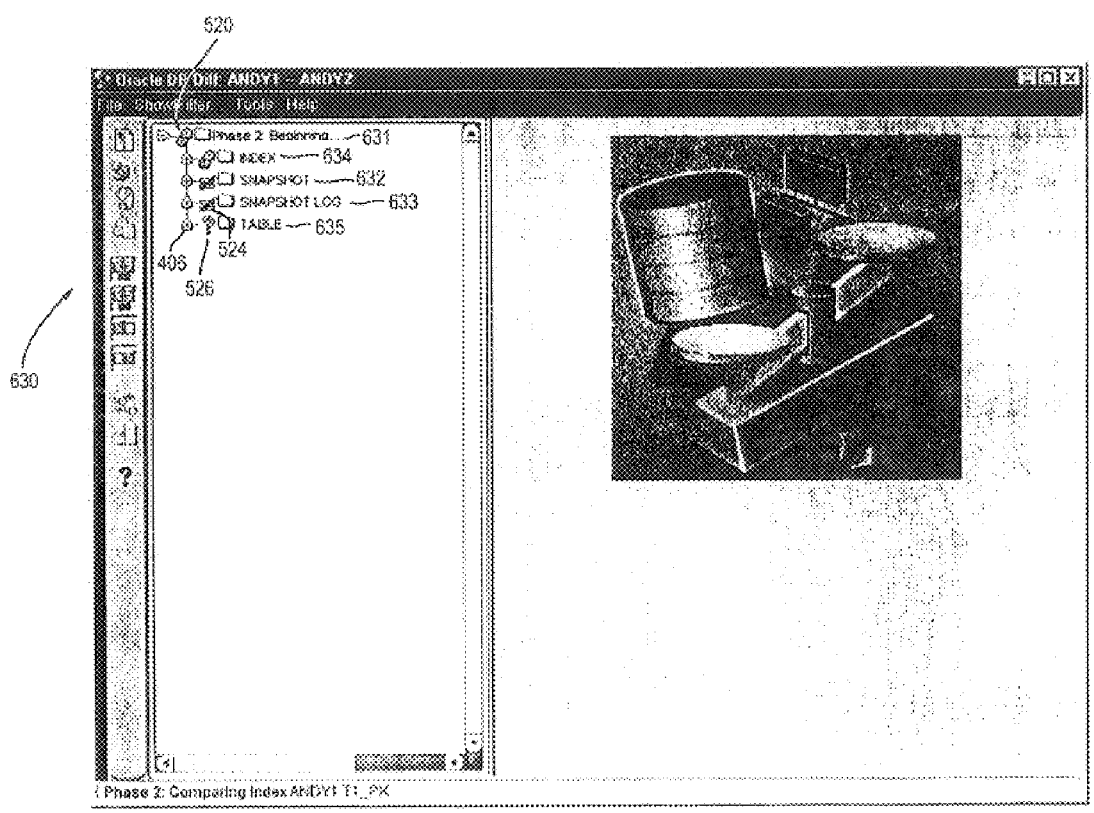
FIG. 15 is an embodiment of a GUI screen for a result view of intermediary Phase 2 results of the dynamic comparison method.

The compare objects process 450 thereafter checks if all the object pairs of the sets of objects being compared have been compared (454). If yes, the compare objects process 450 ends (474). If, however, there are more object pairs to be compared, a select object pair process is executed, as further explained below, to select the current object pair to be compared (456). Once a current object pair to compare is selected, a status symbol of the respective object node is set to the "working" status symbol 520, to indicate the object pair is currently being compared (458). An embodiment of a "working" status symbol 520, as shown in FIG. 15, is a moving set of cogs.

Then, a set container node status process is executed, as further explained below, to set the status symbols for all the respective container nodes, of the current object pair, and the root node of the tree (460). The compare objects process 450 thereafter compares the current object pair (462). After the current object pair is compared, the "working" status symbol 520 associated with the respective object node is cleared, or otherwise deleted, from the tree (464).

Figure 11E:
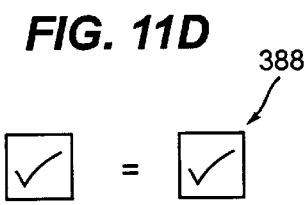
Figure 11F:
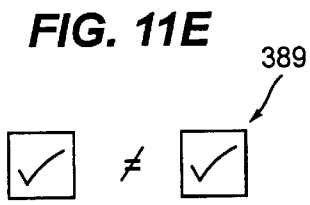

Once the comparison of the current object pair is complete, the compare objects process 450 checks whether the current object pair was found equal (466). If no, the state symbol associated with the object node for the current object pair is changed from the "unknown" state symbol 382, as described in relation to FIGS. 10 and 11B, to a "not equivalent" state symbol (470). An embodiment of a "not equivalent" state symbol 389, as shown in FIG. 11F, indicates that the objects comprising the object pair, one from each of the sets of objects being compared, are not the same, i.e., are not equal.

If, however, the current object pair is found to be equal, the compare objects process 450 changes the state symbol associated with the respective object node from the "unknown" state symbol 382 to a "equivalent" state symbol (468). An embodiment of a "equivalent" state symbol 388, as shown in FIG. 11E, indicates that the objects comprising the object pair, one from each of the sets of objects being compared, are equal.

The compare objects process 450 thereafter executes the set container node status process, as further explained below, to set the status symbols for all the respective container nodes, of the current object pair, and the root node of the tree (472). Then, the compare objects process 450 loops to check again if all the object pairs have been compared (454). If yes, the compare objects process is ended (474).

Figure 13B:
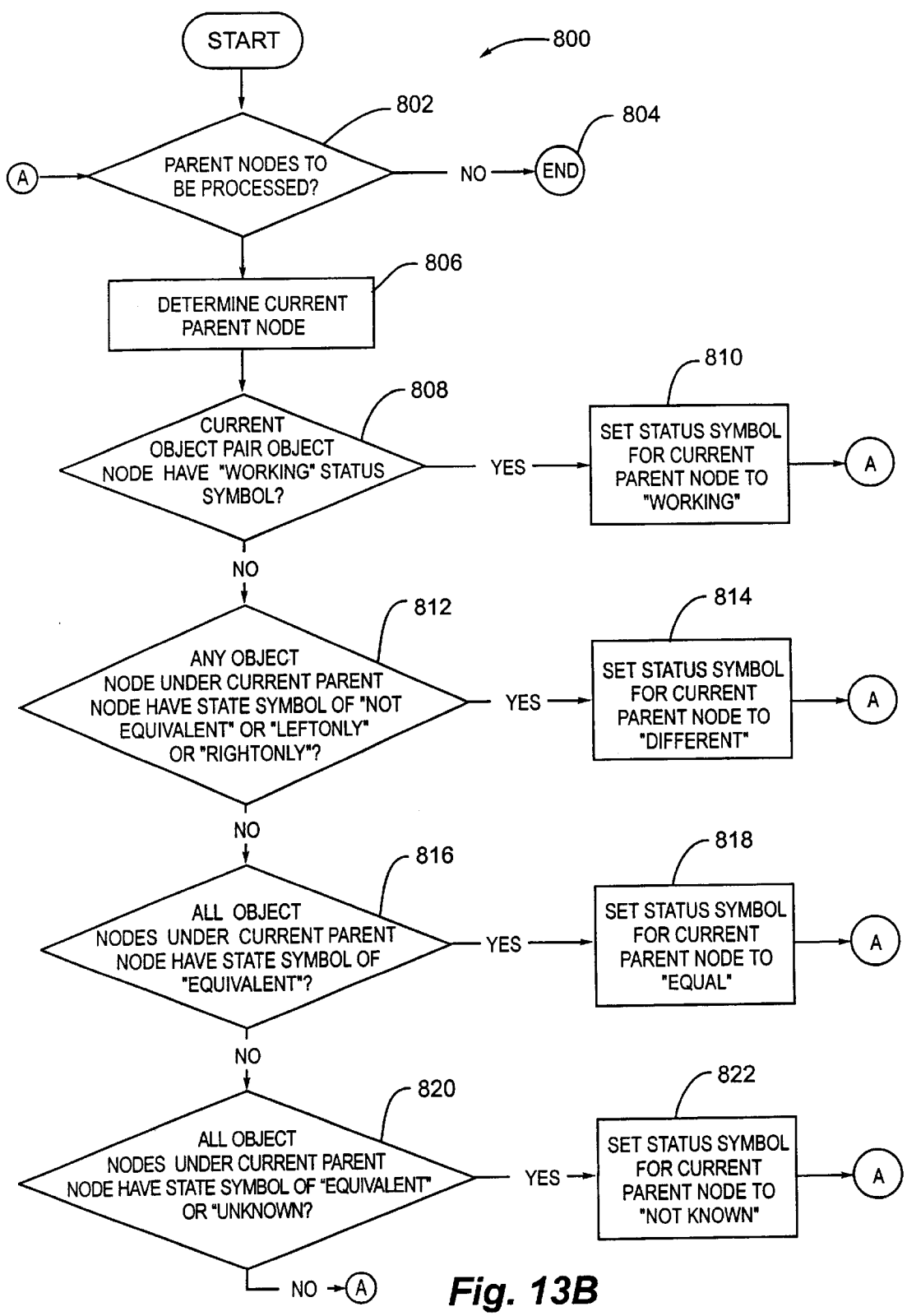
FIG. 13B is an embodiment of a set container node status method according to the invention.

An embodiment of a set container node status process 800, as shown in FIG. 13B, first checks if all the parent nodes of the current object pair object node have been processed; i.e., it checks whether all the container nodes and the root node for the current object pair have had their status symbols updated (802). If yes, the set container node status process 800 is ended (804).

If, however, there are more parent nodes to process, the set container node status process 800 determines the current parent node to process (806). The set container node status process 800 works from the container node of the object node of the current object pair to the root node of the tree. Thus, for example, if the current object pair is a table schema object type, the set container node status process 800 would first determine the schema node of the current object pair object node to be the current parent node (806). In the next iteration, the current parent node would be determined to be the table object type node (806). The final iteration of this example would determine the parent node to be the root node of the tree (806).

Once the current parent node is determined (806), the current object pair object node is checked to see if it has an associated "working" status symbol 520 (808). If it has, the current object pair is being compared. Further, if the current object pair object node has an associated "working" status symbol 520, the set container node status process 800 sets the status symbol for the current parent node to the "working" status symbol 520 (810). The set container node status process 800 then loops to check if there are any more parent nodes to process (802).

If the current object pair object node does not have an associated "working" status symbol 520, the set container node status process 800 checks if there is any object nodes under the current parent node that have a "leftOnly" state symbol 386, a "rightOnly" state symbol 384, or a "not equivalent" state symbol 389 (812). If yes, the set container node status process 800 sets the status symbol for the current parent node to the "different" status symbol 524 (814). Thus, the parent nodes' status symbols are set to indicate if there are any objects of their respective container type, or the respective comparison if the current parent node is the root node of the tree, in one set of objects to be compared but not another, or any objects that are not equal in the sets of objects being compared. The set container node status process 800 then loops to check if there are any more parent nodes to process (802).

If there are no object nodes under the current parent node that have a "leftOnly" state symbol 386, a "rightOnly" state symbol 384, or a "not equivalent" state symbol 389, the set container node status process 800 checks if all the object nodes under the current parent node have an "equivalent" state symbol 388 (816). If yes, the set container node status process 800 sets the status symbol for the current parent node to the "equal" status symbol 522 (818). Thus, the parent nodes' status symbols are set to indicate if all the objects of their respective container type, or the respective comparison if the current parent node is the root node of the tree, are equal in the sets of objects being compared. The set container node status process 800 then loops to check if there are any more parent nodes to process (802).

If not all the object nodes under the current parent node have an "equivalent" state symbol 388, the set container node status process 800 checks if all the object nodes under the current parent node have an "equivalent" state symbol 388 or an "unknown" state symbol 382 (820). If yes, the set container node status process 800 sets the status symbol for the current parent node to the "not known" status symbol 526 (822). Thus, the parent nodes' status symbols are set to indicate if it is currently unknown whether all the objects of their respective container type, or the respective comparison if the current parent node is the root node of the tree, are equal in the sets of objects being compared. The set container node status process 800 then loops to check if there are any more parent nodes to process (802).

If not all the object nodes under the current parent node have an "equivalent" state symbol 388 or an "unknown" state symbol 382 (820), the set container node status process 800 loops to check if there are any more parent nodes to process (802). If no, the set container node status process 800 ends (804).

As an example, the current object pair is of the table object type. The current object pair is compared (462) and found to be equal. Thus, the state symbol associated with the object node for the current object pair is set to the "equivalent" state symbol 388 (468). In this example, all other table type objects in the sets of objects being compared have been compared, and found to be equal. Thus, the set container node status process 800 sets the status symbols of the associated container nodes to the "equal" status symbol 522 (818).

As another example, the current object pair, of the table object type, is compared (462) and found to not be equal.

Thus, the state symbol associated with the object node for the current object pair is set to the "not equivalent" state symbol 389 (470). In this example, all other table type object pairs in the sets of objects being compared have been compared, and each other table type object pair was found equal. Then, at this time, the status symbols of the associated container nodes for the current object pair, i.e., the schema node, if there is one, and the table object type node, are set to the "different" status symbol 524 (814). The root node status symbol is also set to the "different" status symbol 524 (814).

In an embodiment, the end of the processing of the compare objects process 450 marks the end of Phase 2 of the dynamic comparison process 100.

An exemplary tree 630, as shown in FIG. 15, indicates that Phase 2 is in progress. The root node 632 is initialized to Phase 2 and the status symbol associated with the root node 632 is the "working" status symbol 520. In the exemplary comparison associated with tree 630, four object types are being compared: indexes, snapshots, snapshot logs, and tables. Thus, there are four object type nodes, 632, 633, 634 and 635, shown in the result view of tree 630.

Further, in tree 630 none of the object type nodes are expanded, as each of them have an associated plus symbol 406. Thus, no schema nodes or object nodes are displayed.

The result view of tree 630 indicates that for the snapshot object type and the snapshot log object type, either an object is found in one set of objects being compared, but not the other, and/or one or more of the corresponding compared object pairs are not equal. This is indicated by the "different" status symbols 524 associated with the snapshot object type node 632 and the snapshot log object type node 633.

The result view of tree 630 also indicates that an index type object pair is currently being compared; the status symbol for the respective index object type node 634 is a "working" status symbol 520. Too, the result view of tree 630 indicates, at this time, the table type object pairs have not all been compared, yet none that have been compared, if any, are unequal. This is indicated by the "not known" status symbol 526 associated with the table object type node 635.

Figure 16:
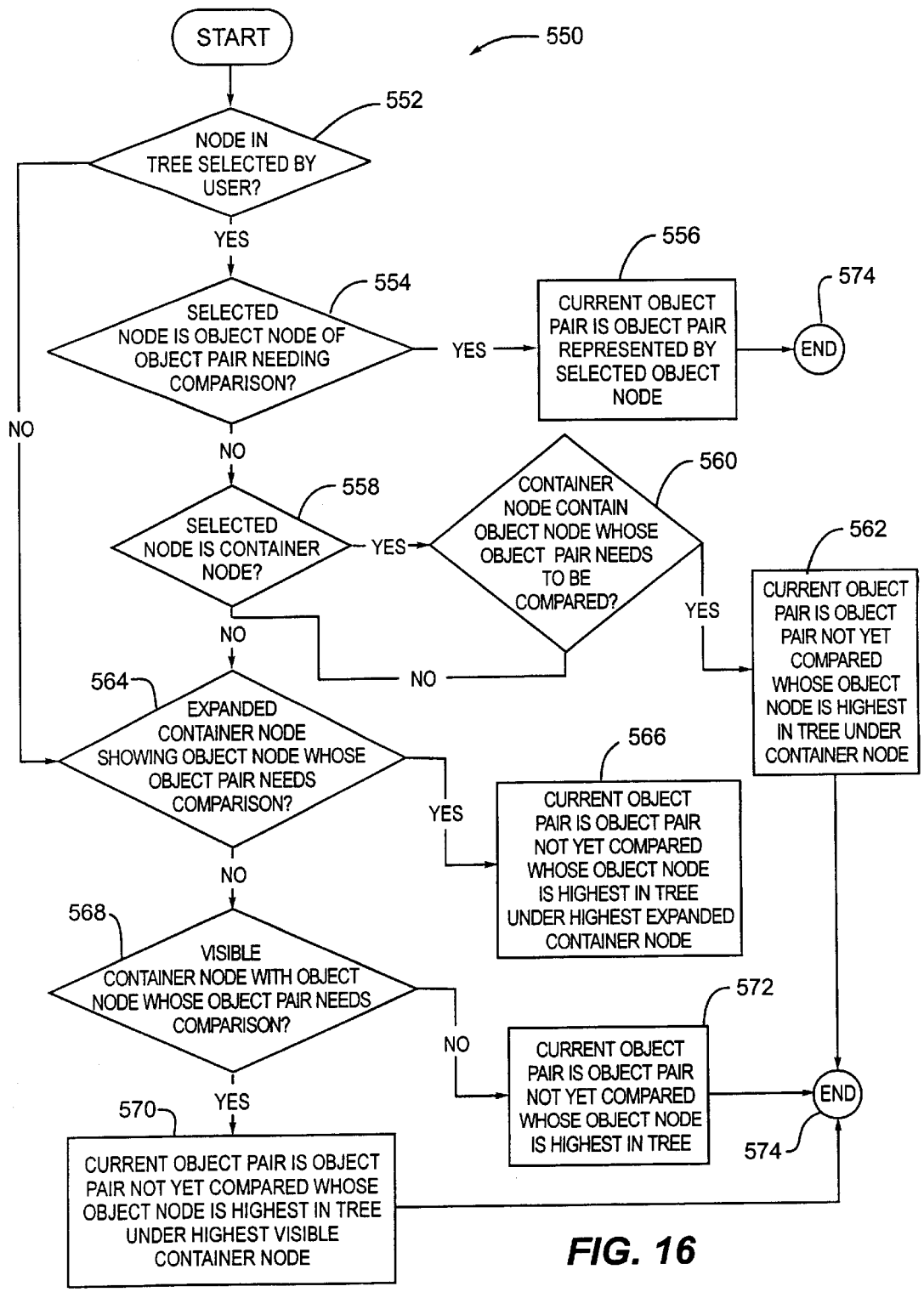
FIG. 16 is an embodiment of a select object pair method according to the invention.

As previously discussed, and shown in FIG. 13A, an embodiment of a compare objects process 450 executes a select object pair process to select, or otherwise choose, a current object pair to compare next (456). An embodiment select object pair process 550, shown in FIG. 16, first checks whether the user has selected a tree node (552). In an embodiment, a user's selection of a tree node indicates the user wishes that node to be compared next. If the user has selected a tree node, the select object pair process 550 then checks if the selected node is an object node for an object pair needing comparison (554). If yes, the current object pair is the object pair represented by the selected object node (556).

If, however, the selected node is not an object node of an object pair needing comparison, the select object pair process 550 checks if it is a container node, i.e., a schema node or an object type node (558). If yes, the select object pair process 550 then checks if the selected container node contains an object node whose respective object pair needs to be compared (560). If yes, the current object pair is the object pair not yet compared that is represented by the top, or first, or highest, object node in the tree under the selected container node (562).

If the selected container node does not contain an object node whose respective object pair is yet to be compared, or the selected node is not a container node, or the user has not selected a tree node, the select object pair process 550 checks if there is an expanded container node in the tree that contains an object node whose respective object pair needs to be compared (564). If yes, the current object pair is the object pair not yet compared that is represented by the top object node visible in the tree under the highest expanded container node (566).

If there is no expanded container node containing an object node whose respective object pair is yet to be compared, the select object pair process 550 checks if there is a visible container node, i.e., a container node shown in the displayed tree view, containing an object node whose respective object pair needs to be compared (568). If yes, the current object pair is the object pair not yet been compared that is represented by the top object node in the tree under the highest visible container node (570). If no, however, the current object pair is then the object pair not yet compared that is represented by the top object node in the tree (572).

After a current object pair is determined, the select object pair process 550 is ended (574).

Thus, for example, referring to FIG. 15 and exemplary tree 630, no container nodes are expanded. Assuming that no tree nodes have been selected by the user, the select object pair process 550 checks if an object pair represented by an object node in a visible container node has yet to be compared, e.g., is there an object pair of the index object type, snapshot object type, snapshot log object type or table object type that is yet to be compared (568). If yes, the current object pair is the object pair yet to be compared that is represented by the object node that is highest in the tree under the highest visible container node (570). Thus, if there are index type object pairs to be compared, the index type object pair whose object node is highest in the tree under the index object type node 634 becomes the current object pair.

In an embodiment, the details of an object or object pair of a selected object node are displayed in a detail view on the right-hand side of the display device, for example, but not limited to, a screen, that displays the object view, Phase 1, or result view, Phase 2, of the tree on the left-hand side. In an embodiment, the details of an object or object pair cease to be displayed in a detail view if the user re-selects the associated object node in the displayed tree. Thus, selecting an object node for an object or object pair acts as a toggle switch for a resultant display view.

In an embodiment, the details of an object or object pair also cease to be displayed in a detail view if the user selects another object node, associated with a different object or object pair. In this case, the current detail view is replaced by a detail view of the newly selected object or object pair.

Figure 17:
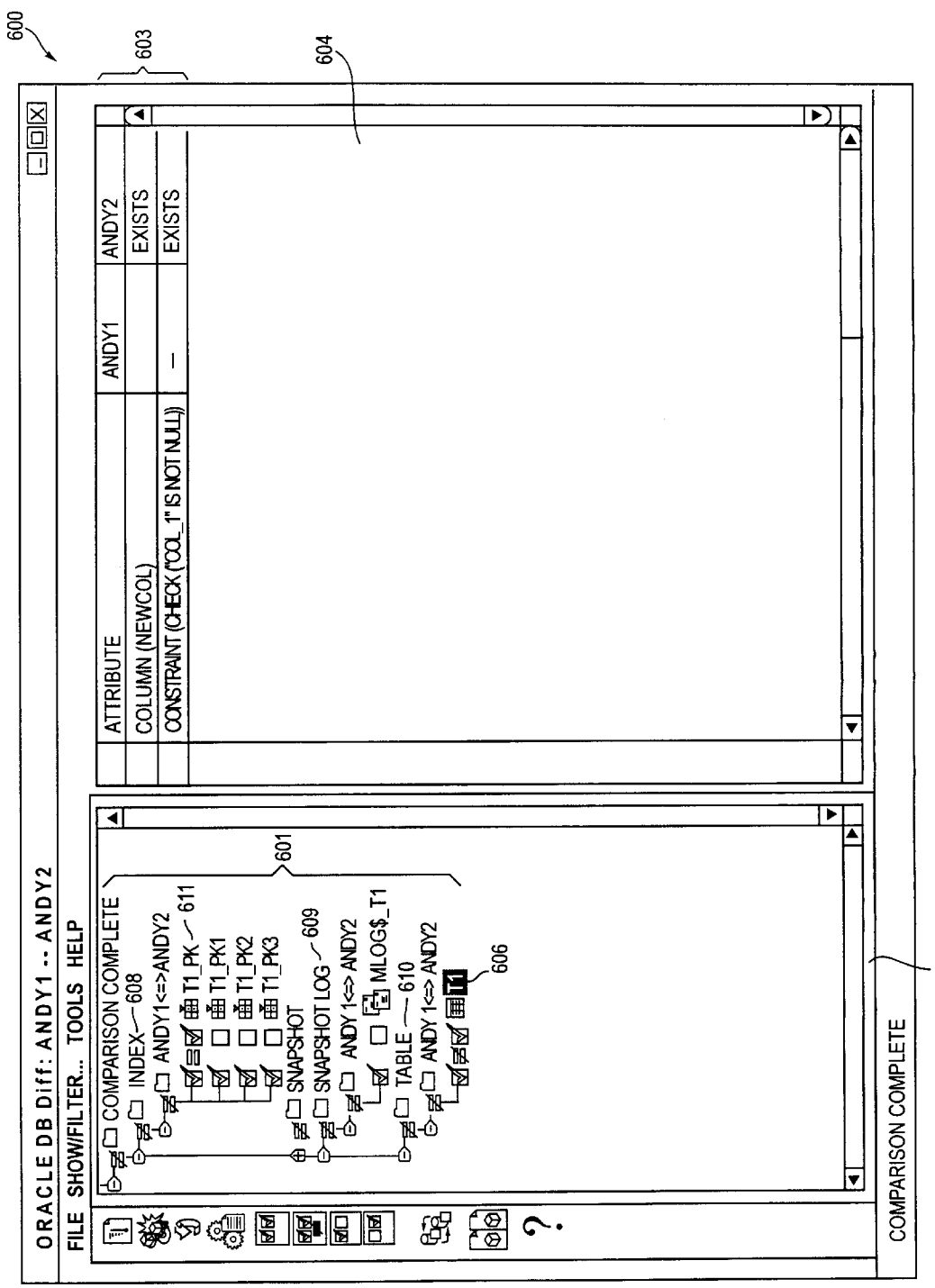
FIG. 17 is an embodiment of a GUI screen comprising both a result view and detailed view.

An exemplary graphical user interface (GUI) screen 600, as shown in FIG. 17, displays a result view 601 of a tree on the left-hand side 602. The GUI screen 600 also displays, at the same time, a detail view 603 of the user-requested T1 table object pair on the right-hand side 604. In an embodiment, the object node identifier 606, i.e., the name associated with the object node, corresponding to the object or object pair whose details are displayed in the detail view 603 is highlighted in the result view 601 (or object view). Thus, in exemplary screen 600, the T1 object node identifier 606 is highlighted.

Figure 18:
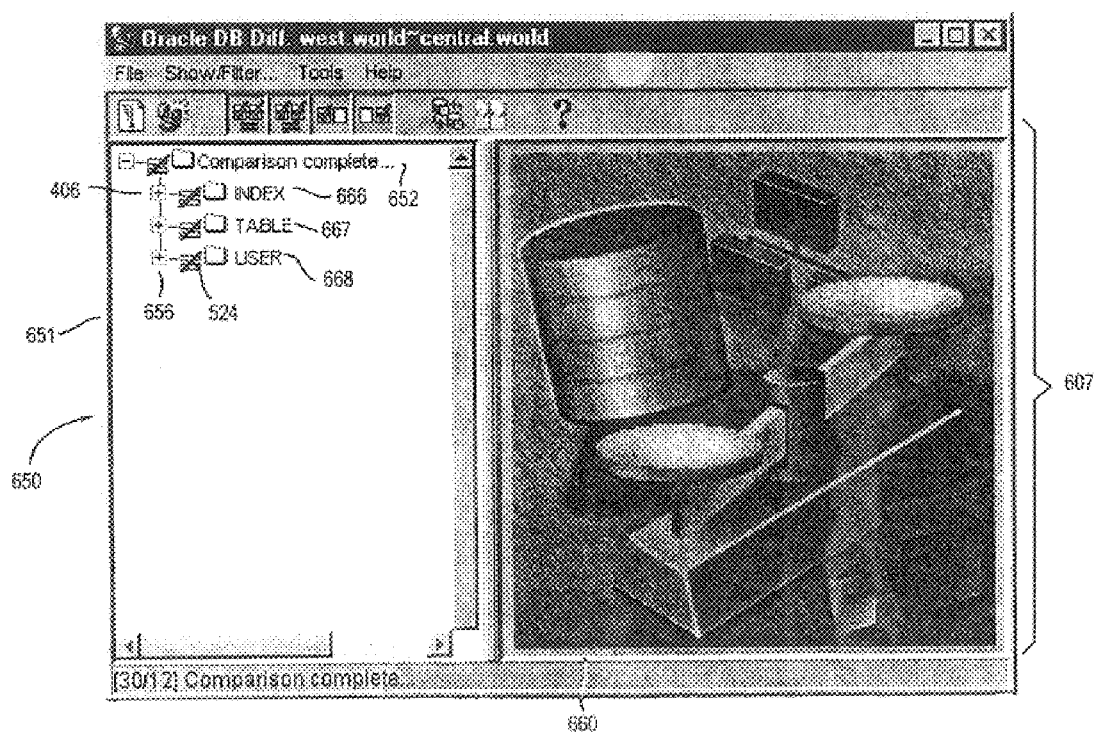
FIG. 18 is an exemplary GUI screen of a result view of final Phase 2 results of the dynamic comparison method.

In an embodiment, if the user has not requested a detail view be displayed, or has canceled, i.e., de-selected, a detail view that was being displayed, with no replacement detail view requested, the dynamic comparison process 100 displays a default "non-detail" view. An embodiment of a "non-detail" view 607 is shown in FIG. 18.

Referring once again to FIG. 3, once Phase 2, and the compare objects process 450, is executed, the dynamic comparison process 100 checks whether the user wishes to rerun the same comparison (110). In an embodiment, the user can choose to rerun the same comparison by selecting a "rerun" graphical user interface (GUI) button. An embodiment of a "rerun" GUI button 403 is shown in FIG. 12.

If the user selects to rerun the same comparison, the dynamic comparison process 100 re-executes Phase 1, i.e., executes the generate tree view process 300 (106), and thereafter, re-executes Phase 2, i.e., executes the compare objects process 450 (108).

The user may also select to run a comparison on the same sets of objects, but with different criteria (116). In an embodiment, the user can choose to run a new comparison on the same sets of objects by selecting a "new run" GUI button. An embodiment of a "new run" GUI button 405 is shown in FIG. 12.

If the user selects to run a new comparison with different criteria on the same sets of objects, the dynamic comparison process 100 requests the user to once more refine the comparison request (104). Thereafter, the dynamic comparison process reexecutes Phase 1, i.e., executes the generate tree view process 300 (106), and then reexecutes Phase 2, i.e., executes the compare objects process 450 (108).

If the user does not choose to rerun the same comparison or to run a new comparison on the same sets of objects, the dynamic comparison process 100 is ended (120). Further, in an embodiment, the user can choose to end the present comparison, i.e., terminate the dynamic comparison process 100 processing, at any time.

In an embodiment, at any time during the processing of the dynamic comparison process 100, the user can filter one or more tree nodes, and their respective status, that is displayed in an object view or result view to the user. The user can set, or reset, filters by selecting respective "filter" GUI buttons 407, as shown in FIG. 12.

In an embodiment, if a user wishes to filter out, i.e., not show, in a result view of a tree the object nodes associated with object pairs that are equal, the user can select a "equal" filter GUI button 409, as shown in FIG. 12. If the object nodes whose associated object pairs are equal were previously filtered out, the user may thereafter include them, or otherwise filter them back into, the result view of the tree by re-selecting the "equal" filter GUI button 409. Thus, in an embodiment, the "equal" filter GUI button 409 is a toggle button, toggling the filter respectively on and off.

In an embodiment, if a user wishes to filter out in a result view of a tree the object nodes associated with unequal object pairs, the user can select a "different" filter GUI button 411, as shown in FIG. 12. If the object nodes whose object pairs are not equal were previously filtered out, the user may thereafter re-include them in the result view of the tree by re-selecting the "different" filter GUI button 411. Thus, in an embodiment, the "different" filter GUI button 411 is a toggle button, toggling the filter respectively on and off.

In an embodiment, if a user wishes to filter out in an object view or a result view of a tree the object nodes associated with objects that are only present in the left source, the user can select a "leftOnly" filter GUI button 413, as shown in FIG. 12. If the object nodes associated with objects that are only in the left source were previously filtered out, the user may thereafter re-include them in the respective tree view by reselecting the "leftOnly" filter GUI button 413. Thus, in an embodiment, the "leftOnly" filter GUI button 413 is a toggle button, toggling the filter respectively on and off. In an embodiment, if a user wishes to filter out in an object view or a result view of a tree the object nodes associated with objects that are only present in the right source, the user can select a "rightOnly" filter GUI button 415, as shown in FIG. 12. If the object nodes associated with objects that are only in the right source were previously filtered out, the user may thereafter re-include them in the respective tree view by re-selecting the "rightOnly" filter GUI button 415. Thus, in an embodiment, the "rightOnly" filter GUI button 415 is a toggle button, toggling the filter respectively on and off.

Any time during the dynamic comparison process 100, the user can request status of the comparison of the sets of objects being compared by selecting a "status" GUI button 417, as shown in FIG. 12. In an embodiment, if the comparison is completed and the user requests status of the comparison, i.e., the user selects the "status" GUI button 417, the dynamic comparison process 100 displays status including, but not limited to, the number of objects in each of the sets of objects being compared and the number of equivalent object pairs in the sets of objects being compared.

In an embodiment, if the comparison is in progress and the user requests status of the comparison, the dynamic comparison process 100 displays status including, but not limited to, the current object pair being compared and the object type of the current object pair being compared.

In an embodiment, the user may also request that an HTML report be generated on the current comparison by selecting a "report" GUI button 419, as shown in FIG. 12.

In an embodiment, the respective HTML report can include, but is not limited to, a summary of the schema and non-schema type objects requested to be compared, the result of the comparison and hyperlinks to details in the detail view displayed on the right side of the screen, if a detail view is currently displayed.

In an embodiment, the user may also launch a wizard for synchronizing one or more of the object pairs previously compared by selecting a "sync" GUI button 421, as shown in FIG. 12.

In an embodiment, the user may request help from the dynamic comparison process 100 by selecting a "help" GUI button 423, as shown in FIG. 12.

An exemplary graphical user interface (GUI) comparison display 650 on a screen, as shown in FIG. 18, displays the results of a dynamic comparison process 100 execution. In exemplary GUI comparison display 650, a result view 651 and an embodiment of a "non-detail" view 607 are shown. In GUI comparison display 650, no object or object pair details have been requested as there is a "non-detail" view 607 displayed on the right-side 660 of the screen.

In the respective comparison corresponding to GUI comparison display 650, three object types were compared for the west.world database, or baseline, and the central.world database, or baseline: indexes, tables and users. Thus, there are three object type nodes in the tree of the result view 651: node 666 corresponding to the index object type, node 667 corresponding to the table object type, and node 668 corresponding to the user object type.

The dynamic comparison process 100 is completed for the comparison represented in the GUI comparison display 650, as indicated by the root node 652. Differences were detected for each object type compared; either an object of the respective object type existed in west.world but not central.world, or in central.world but not west.world, or an object pair of the object type was just not equal. This indicated by the respective "different" status symbols 524 associated with each object type node 666, 667 and 668. Further, none of the object type nodes 666, 667 and 668 have been expanded, as indicated by the respective plus symbols 406 associated with each of them.

Figure 19:
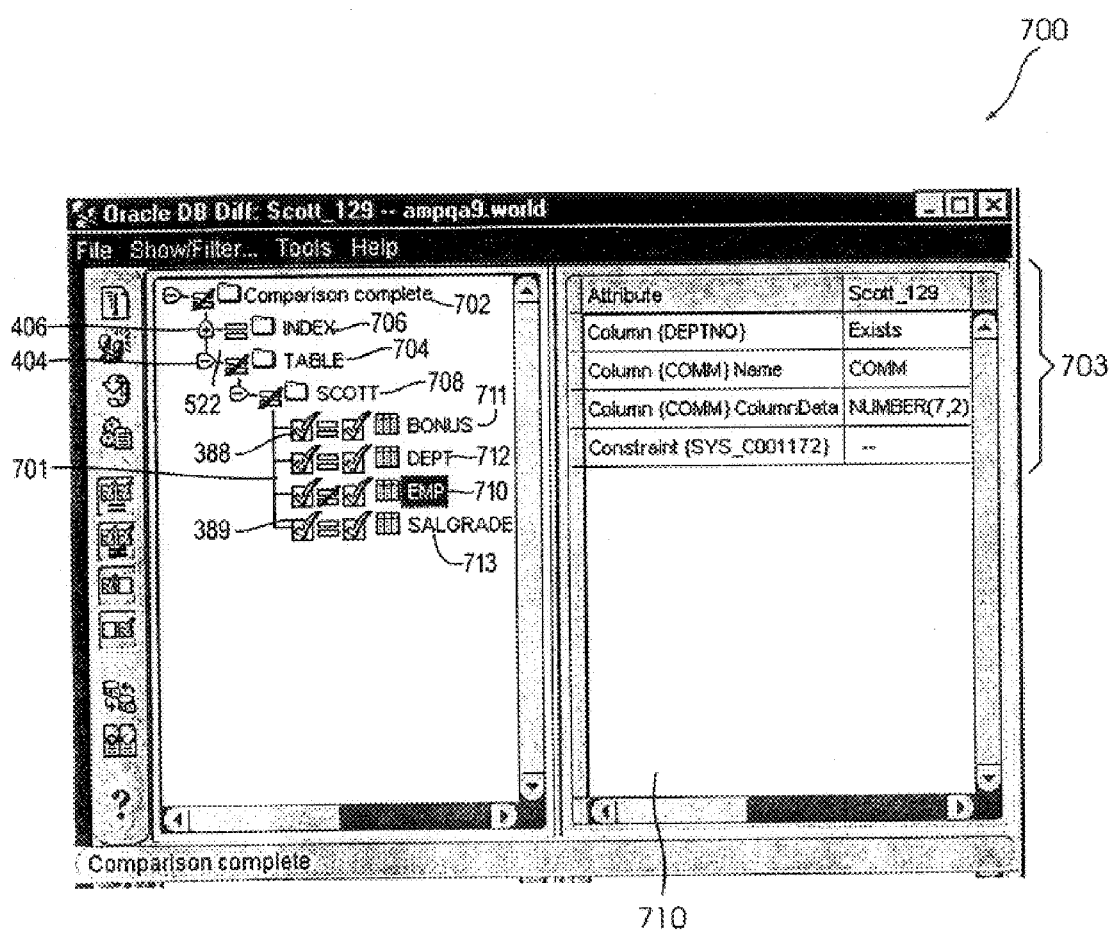
FIG. 19 is an exemplary GUI screen of a result view of final Phase 2 results of the dynamic comparison method.

A second exemplary GUI comparison display 700 on a screen, as shown in FIG. 19, displays the results of a dynamic comparison process 100 execution. In exemplary GUI comparison display 700, a result view 701 and a detail view 703 are shown.

In the comparison corresponding to GUI comparison display 700, two object types were compared for the Scott_129 database, or baseline, and the ampqa9.world database, or baseline: indexes and tables. Thus, there are two object type nodes in the tree: node 706 corresponding to the index object type and node 704 corresponding the table object type.

The dynamic comparison process 100 is completed for the comparison represented by GUI comparison display 700, as indicated by the root node 702. In the respective comparison, the index type object pairs compared in the two databases, or baselines, were found to be equal, as indicated by the "equal" status symbol 522 associated with the index object type node 706. The index object type node 706 is not expanded in the result view 701, as indicated by the respective plus symbol 406 associated with it.

In exemplary GUI comparison display 700, the table object type node 704 is expanded, as indicated by the minus symbol 404 associated with it. In the comparison corresponding to GUI comparison screen 700, tables in the SCOTT schema for both sets of objects being compared were compared. The result view 701 of the tree shows a SCOTT schema node 708 under, or otherwise contained in, the table object type node 704. The SCOTT schema node 708 is expanded, as indicated by its respective minus symbol 404.

There were four table object pairs in the SCOTT schemas of the sets of objects compared: a Bonus table object pair, a Dept table object pair, a Emp table object pair, and a Salgrade table object pair. Thus, there are four object nodes in the tree of the result view 701 under, or otherwise contained in, the SCOTT schema node 708: node 711 corresponding to the Bonus table object pair, node 712 corresponding the Dept table object pair, node 710 corresponding to the Emp table object pair, and node 713 corresponding to the Salgrade table object pair.

The result view 701 indicates that the objects of the Bonus object pair, Dept object pair and Salgrade object pair are equal, as their respective object nodes have corresponding "equivalent" state symbols 388. The result view 701 also indicates that objects of the Emp object pair are not equal, as the respective object node 710 has a corresponding "not equivalent" state symbol 389. Further, as at least one object pair of the SCOTT schemas are not equal, the SCOTT schema node 708 has a corresponding "different" status symbol 524 associated with it. Too, as at least one object pair of table type objects are not equal, the table object type node 704 also has a corresponding "different" status symbol 524 associated with it.

Detailed results of the Emp table object pair were requested to be displayed by the user, as indicated by the detail view 703 displayed on the right-hand side 710 of the exemplary GUI comparison display 700, and as indicated by the highlighted EMP object node identifier in the result view 701. The detailed result view 703 displays details of the Emp table objects of both the Scott_129 database, or baseline, (shown), and the ampqa9.world database, or baseline, (not shown).

System Architecture Overview

A computer system generally may take many forms, from a configuration including a variety of processing units, as further described herein, networked together to function as an integral entity, to a single computer or computing device, for example, but not limited to, e.g., a personal computer, operational in a stand-alone environment. The present invention can be embodied in any of these computer system configurations.

Figure 1A:
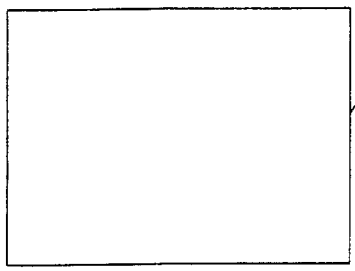
FIG. 1A is an example of a prior art comparison.
Figure 1A:
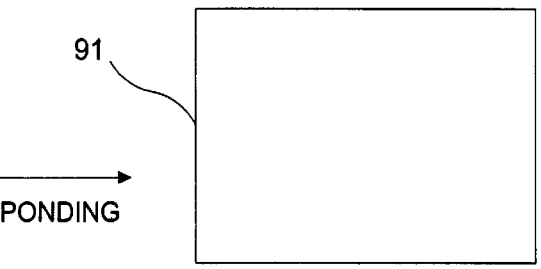
Figure 1A:
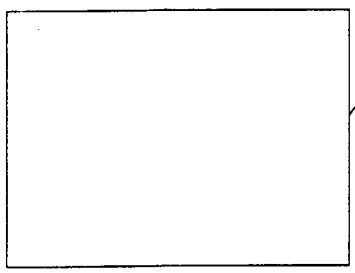
Figure 1A:
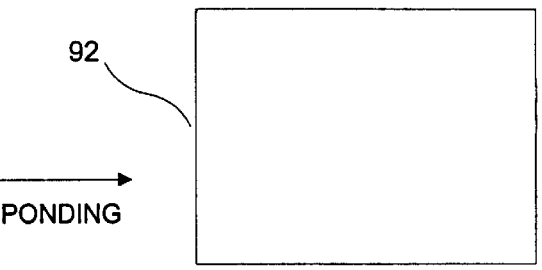
Figure 1A:
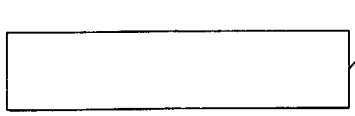
Figure 1A:
Figure 1A:
Figure 1A:
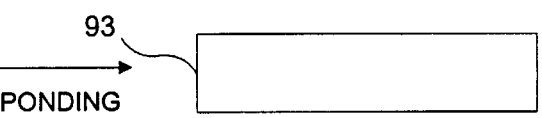
Figure 1A:
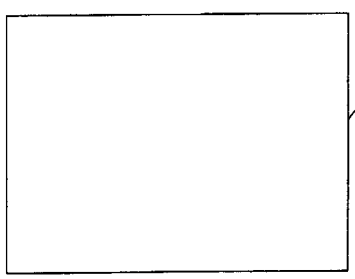
Figure 1A:
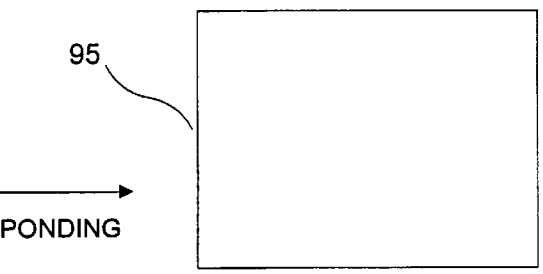
Figure 1B:
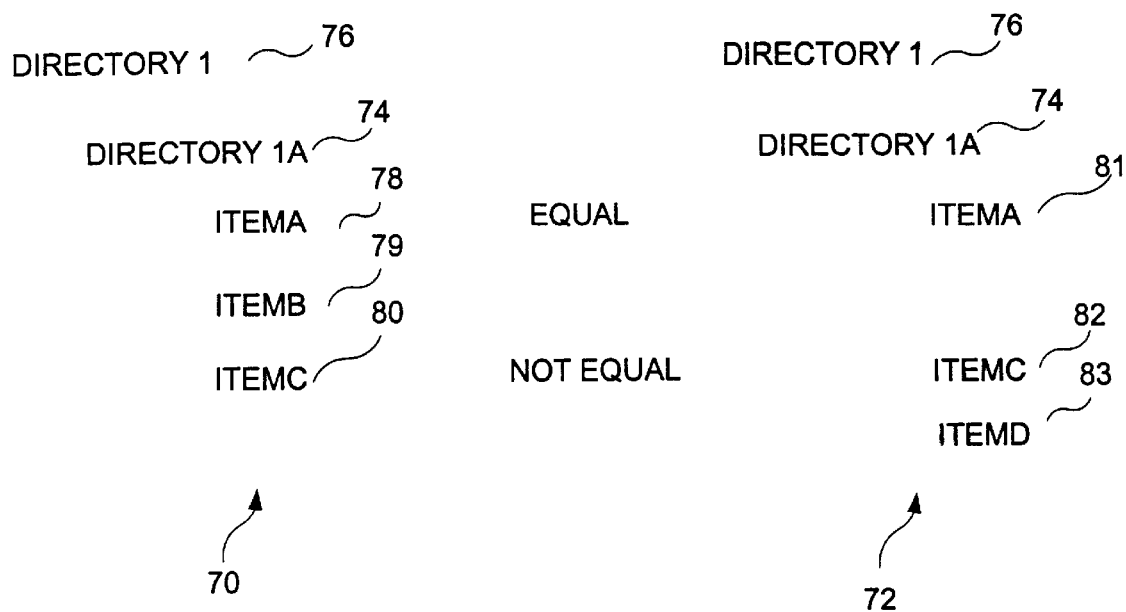
FIG. 1B is an example of a prior art resultant comparison display.
Figure 2A:
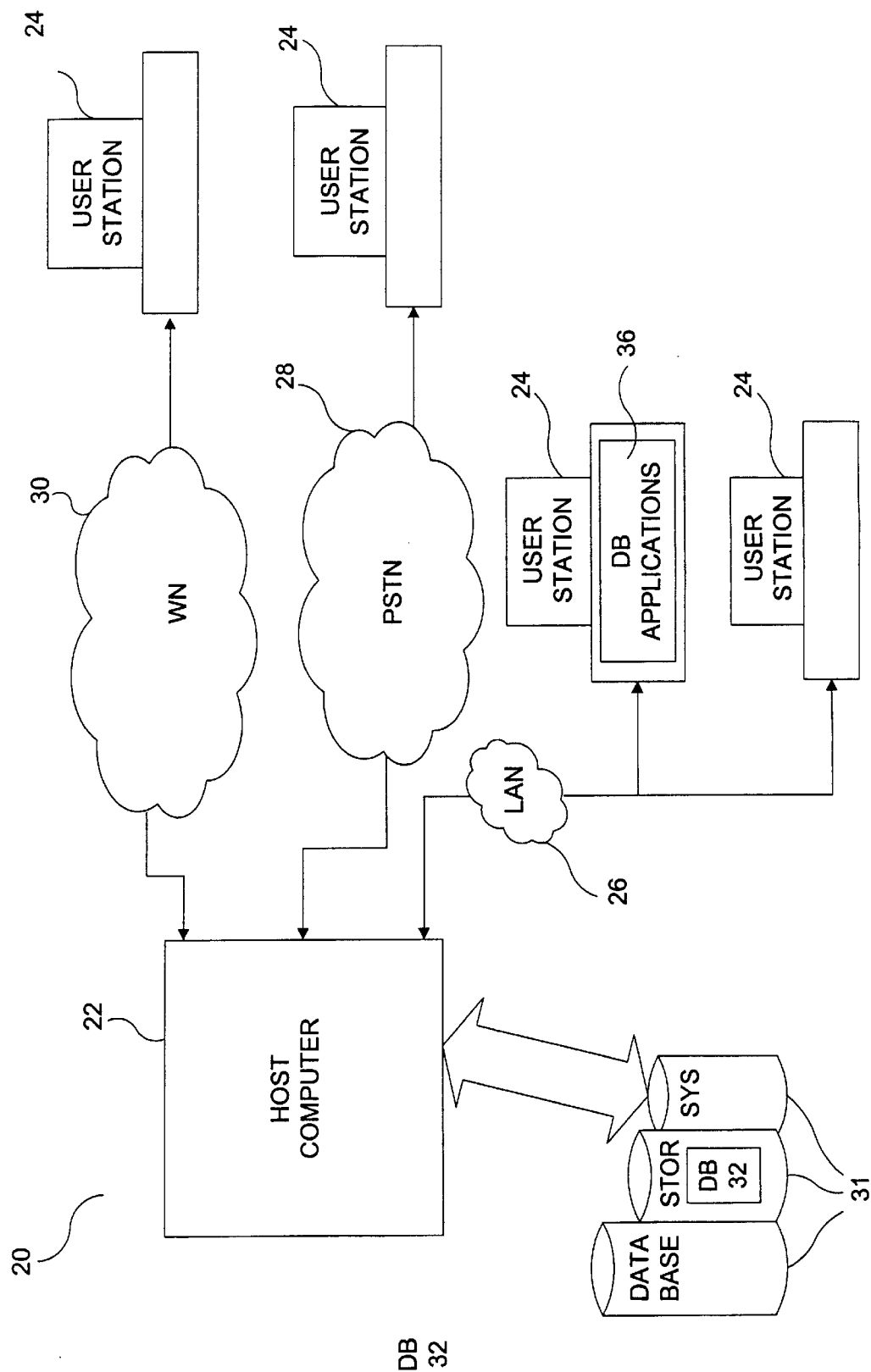
FIG. 2A is a simplified block diagram of an exemplary computer system environment for executing comparison requests.

Referring to FIG. 2A, in an embodiment, a computer system 20 includes a host computer 22 connected to a plurality of individual user stations 24. In an embodiment, the user stations 24 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 24 are connected to the host computer 22 via a local area network ("LAN") 26. Other user stations 24 are remotely connected to the host computer 22 via a public telephone switched network ("PSTN") 28 and/or a wireless network 30.

In an embodiment, the host computer 22 operates in conjunction with a data storage system 31, wherein the data storage system 31 contains a database 32 that is readily accessible by the host computer 22.

In alternative embodiments, the database 32 may be resident on the host computer, stored, e.g., in the host computer's ROM, PROM, EPROM, or any other memory chip, and/or its hard disk. In yet alternative embodiments, the database 32 may be read by the host computer 22 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 22 can access two or more databases 32, stored in a variety of mediums, as previously discussed.

Figure 2B:
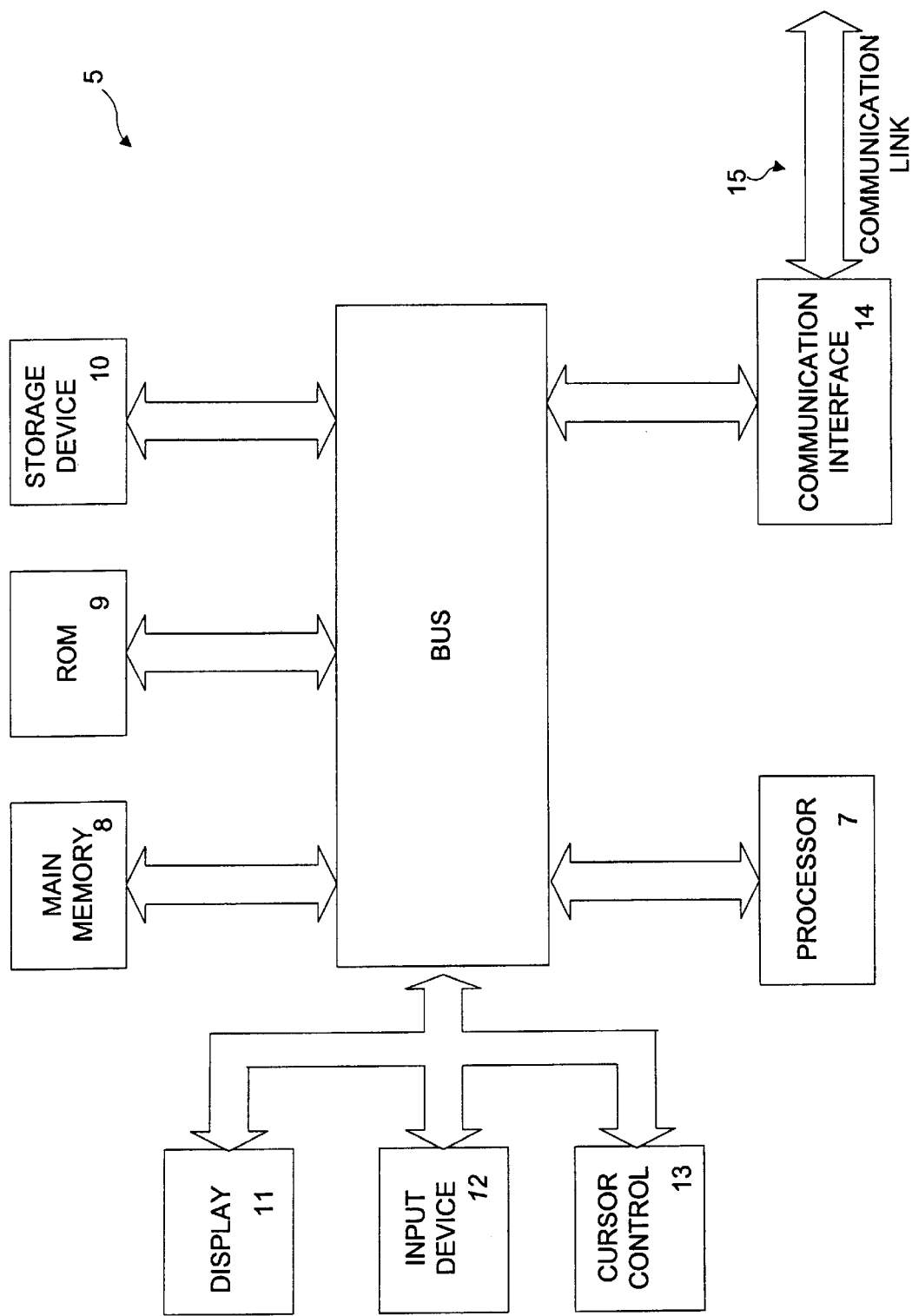
FIG. 2B is a simplified block diagram of an exemplary user station and an exemplary host computer of FIG. 2A.

Referring to FIG. 2B, in an embodiment, each user station 24 and the host computer 22, each referred to generally as a processing unit, embodies a general architecture 5. A processing unit includes a bus 6 or other communication mechanism for communicating instructions, messages and data, collectively, information, and one or more processors 7 coupled with the bus 6 for processing information. A processing unit also includes a main memory 8, such as a random access memory (RAM) or other dynamic storage device, coupled to the bus 6 for storing dynamic data and instructions to be executed by the processor(s) 7. The main memory 8 also may be used for storing temporary data, i.e., variables, or other intermediate information during execution of instructions by the processor(s) 7.

A processing unit may further include a read only memory (ROM) 9 or other static storage device coupled to the bus 6 for storing static data and instructions for the processor(s) 7. A storage device 10, such as a magnetic disk or optical disk, may also be provided and coupled to the bus 6 for storing data and instructions for the processor(s) 7.

A processing unit may be coupled via the bus 6 to a display device 11, such as, but not limited to, a cathode ray tube (CRT), for displaying information to a user. An input device 12, including alphanumeric and other keys, is coupled to the bus 6 for communicating information and command selections to the processor(s) 7. Another type of user input device may include a cursor control 13, such as, but not limited to, a mouse, a trackball, a fingerpad, or cursor direction keys, for communicating direction information and command selections to the processor(s) 7 and for controlling cursor movement on the display 11.

According to one embodiment of the invention, the individual processing units perform specific operations by their respective processor(s) 7 executing one or more sequences of one or more instructions contained in the main memory 8. Such instructions may be read into the main memory 8 from another computer-readable medium, such as the ROM 9 or the storage device 10. Execution of the sequences of instructions contained in the main memory 8 causes the processor(s) 7 to perform the process steps described herein. In alternative embodiments, hard-wired circuitry may be used in place of or in combination with software instructions to implement the invention. Thus, embodiments of the invention are not limited to any specific combination of hardware circuitry and/or software.

The term "computer-readable medium," as used herein, refers to any medium that provides information to the processor(s) 7. Such a medium may take many forms, including, but not limited to, non-volatile, volatile and transmission media. Non-volatile media, i.e., media that can retain information in the absence of power, includes the ROM 9. Volatile media, i.e., media that can not retain information in the absence of power, includes the main memory 8. Transmission media includes coaxial cables, copper wire and fiber optics, including the wires that comprise the bus 6. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-readable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 7 can retrieve information.

Various forms of computer-readable media may be involved in providing one or more sequences of one or more instructions to the processor(s) 7 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 6 may receive the infrared signals and place the instructions therein on the bus 6. The bus 6 may carry the instructions to the main memory 8, from which the processor(s) 7 thereafter retrieves and executes the instructions. The instructions received by the main memory 8 may optionally be stored on the storage device 10, either before or after their execution by the processor(s) 7.

Each processing unit may also include a communication interface 14 coupled to the bus 6. The communication interface 14 provides two-way communication between the respective user stations 24 and the host computer 22. The communication interface 14 of a respective processing unit transmits and receives electrical, electromagnetic or optical signals that include data streams representing various types of information, including instructions, messages and data.

A communication link 15 links a respective user station 24 and a host computer 22. The communication link 15 may be a LAN 26, in which case the communication interface 14 may be a LAN card. Alternatively, the communication link 15 may be a PSTN 28, in which case the communication interface 14 may be an integrated services digital network (ISDN) card or a modem. Also, as a further alternative, the communication link 15 may be a wireless network 30.

A processing unit may transmit and receive messages, data, and instructions, including program, i.e., application, code, through its respective communication link 15 and communication interface 14. Received program code may be executed by the respective processor(s) 7 as it is received, and/or stored in the storage device 10, or other associated non-volatile media, for later execution. In this manner, a processing unit may receive messages, data and/or program code in the form of a carrier wave.

While preferred embodiments are disclosed herein, many variations are possible which remain within the spirit and scope of the invention. Such variations are clear after inspection of the specification, drawings and claims herein. The invention therefore is not to be restricted except by the scope and spirit of the appended claims.

What is claimed is:

1. A method for displaying comparison information for a comparison of two sets of objects, comprising:

generating a node for a tree for each object pair of the two sets of objects in which an object pair comprises an object from a first set of the two sets of objects and a corresponding object from the second set of the two sets of objects;

generating a node for said tree for each object of said first set of the two sets of objects that does not have a corresponding object in said second set of the two sets of objects;

generating a node for said tree for each object of said second set of the two sets of objects that does not have a corresponding object in said first set of the two sets of objects; and displaying said tree on a display device.

2. The method for displaying comparison information of claim 1, further comprising:

adding a first symbol to a node of said tree for an object pair in which said first symbol indicates that an object of said object pair of said node is in a first set of the two sets of objects and said corresponding object is in the second set of the two sets of objects;

adding a second symbol to a node of said tree for an object of said first set of said two sets of objects in which said second symbol indicates that said object is in said first set of the two sets of objects but is not in the second set of said two sets of objects; and adding a third symbol to a node of said tree for an object of said second set of said two sets of objects in which said third symbol indicates that said object is in said second set of the two sets of objects but is not in the first set of said two sets of objects.

3. The method for displaying comparison information of claim 1, further comprising generating a node for said tree for an object type of an object pair of the two sets of objects.

4. The method for displaying comparison information of claim 3, further comprising displaying said node for said object pair of the two sets of objects in said tree under said node for said object type.

5. The method for displaying comparison information of claim 1, wherein each object pair of said two sets of objects is of a object type, said method further comprising generating a graphical representation for a node for said tree for an object pair wherein said graphical representation comprises a graphical representation of said object type of said object pair.

6. The method for displaying comparison information of claim 1, in which each object of each object pair has the same unqualified object name, said method further comprising naming each node of an object pair of said object tree the unqualified object name of said object pair.

7. A method for displaying comparison information for a comparison of a set of objects from two or more collections of objects, said method comprising:

generating a tree, said tree comprising a tree node for every object of said set of objects of a first collection of objects;

adding a tree node to said tree for every object of said set of objects of a second collection of objects for which there is no tree node; and displaying said tree on a display device.

8. The method for displaying comparison information of claim 7, further comprising adding a symbol to a tree node in which said tree node is a tree node for an object of said set of objects of said first collection of objects and said object of said set of objects of said first collection of objects has a corresponding object in said second collection of objects, said symbol indicative that said tree node represents an object pair comprising an object from said first collection of objects and a corresponding object from said second collection of objects.

9. The method for displaying comparison information of claim 8, further comprising:

adding a second symbol to a second tree node in which said second tree node is a tree node for an object of said set of objects of said first collection of objects, and in which said second symbol indicates that said tree node represents an object from said first collection of objects that does not have a corresponding object from said second collection of objects; and adding a third symbol to a third tree node in which said third tree node is a tree node for an object of said second collection of objects, and in which said third symbol indicates that said tree node represents an object from said second collection of objects that does not have a corresponding object from said first collection of objects.

10. The method for displaying comparison information of claim 7, further comprising adding a tree node to said tree for an object type of an object of said set of objects of said first collection of objects.

11. A system for comparing objects from a first set of objects and from a second set of objects, comprising:

a tree comprising comparison information in which said comparison information comprises data from a comparison of an object of the first set of objects and an object from the second set of objects; and a display device that displays said tree.

12. The system of claim 11, in which said tree further comprises information on each of the objects of the first set of objects and each of the objects of the second set of objects.

13. The system of claim 12, in which said information on each of the objects of the first set of objects and each of the objects of the second set of objects comprises information on whether an object is in the first set of objects, in the second set of objects, or in both the first and the second set of objects.

14. A method for creating a display of comparison information for a comparison of two or more sets of objects, comprising:

populating a tree with a tree node for every object to be compared of a first set of objects;

adding a symbol to a tree node for an object of said first set of objects in which said object of said first set of objects has a corresponding object in a second set of objects; and adding a tree node to said tree for an object to be compared of said second set of objects if said object of said second set of objects does not have a corresponding object in said first set of objects.

15. The method of creating a display of comparison information of claim 14, further comprising:

adding a second symbol to a second tree node for an object of said first set of objects that does not have a corresponding object in said second set of objects; and adding a third symbol to a third tree node for an object of said second set of objects that does not have a corresponding object in said first set of objects.

16. The method for creating a display of comparison information of claim 14, further comprising changing said symbol of said tree node for an object of said first set of objects for which said object of said first set of objects has a corresponding object in a second set of objects to a second symbol after the comparison of said object of said first set of objects and said corresponding object of said second set of objects, said second symbol indicative of the result of said comparison of said object of said first set of objects and said corresponding object of said second set of objects.

17. The method for creating a display of comparison information of claim 14, further comprising:

generating an object view, said object view comprising said tree;

generating a result view, said result view comprising information on an object to be compared of said first set of objects; and generating a display view, said display view comprising said object view and said result view.

18. A method for comparing two or more sets of objects, comprising:

identifying two or more object pairs of the two or more sets of objects, an object pair comprising an object from a first set of the two or more sets of objects and a corresponding object from a second set of the two or more sets of objects;

generating a representation of each of the two or more object pairs of the two or more sets of objects; and comparing an object pair of said two or more object pairs, said object pair determined by a user.

19. The method for comparing two or more sets of objects of claim 18, in which said representation of an object pair is displayed to a user and said user determines an object pair to be compared by selecting said representation of said object pair.

20. The method for comparing two or more sets of objects of claim 18, in which each object pair is of an object type, and in which said comparison of an object pair comprises a comparison of a first object pair, further comprising:

generating a representation of each object type of the two or more object pairs;

grouping the representations of each object pair of an object type with the representation of said object type;

displaying the representations of each object type; and comparing a second object pair of said two or more object pairs, said second object pair to be compared determined by a user selecting said representation of said object type of said object pair.

21. The method for comparing two or more sets of objects of claim 20, in which said second object pair has a representation that is grouped first with said object type of said second object pair.

22. The method for comparing two or more sets of objects of claim 20, in which said grouping of the representations of each object pair of an object type with the representation of said object type comprises grouping the representation of an initial object pair of an object type below the representation of said object type and grouping a representation of another object pair of said object type below the representation of said initial object pair of said object type, and further in which said second object pair to be compared is said initial object pair of said object type of the user selected representation.

23. A method for comparing two or more sets of objects, comprising:

identifying two or more object pairs of the two or more sets of objects, an object pair comprising an object from a first set of the two or more sets of objects and a corresponding object from a second set of the two or more sets of objects;

comparing a first object pair; and, displaying a result of the comparison of said first object pair without waiting to compare a second object pair.

24. The method for comparing two or more sets of objects of claim 23, further comprising:

comparing said second object pair; and displaying the result of the comparison of said first object pair prior to the completion of the comparison of said second object pair.

25. The method for comparing two or more sets of objects of claim 23, further comprising:

comparing said second object pair; and displaying the result of the comparison of said first object pair prior to the start of the comparison of said second object pair.

26. The method for comparing two or more sets of objects of claim 23, further comprising:

displaying a first symbol during the comparison of said first object pair, said first symbol comprising an indication that said first object pair is being compared;

displaying a second symbol during the comparison of said first object pair, said second symbol comprising an indication that the status of a comparison of said second object pair is not known; and changing the display of said first symbol to a display of a third symbol after the comparison of said first object pair is complete, said third symbol comprising said result of said comparison of said first object pair.

27. A method for comparing two or more sets of objects, comprising:

identifying a first object from a first set of the two or more sets of objects;

identifying a second object from said first set of the two or more sets of objects;

identifying a third object from a second set of the two or more sets of objects;

identifying a fourth object from said second set of the two or more sets of objects;

comparing said first object and said third object;

comparing said second object and said fourth object;

displaying a result of the comparison of said first object and said third object prior to the completion of the comparison of said second and said fourth object; and displaying a result of the comparison of said second object and said fourth object.

28. The method for comparing two or more sets of objects of claim 27, wherein said result of the comparison of said first object and said third object is displayed prior to the start of the comparison of said second object and said fourth object.

29. A machine readable medium having stored thereon a program for causing a computer to:

generate a node for a tree for each object pair of two sets of objects to be compared, an object pair comprising an object from a first set of said two sets of objects and a corresponding object from the second set of said two sets of objects;

generate a node for said tree for each object of said first set of said two sets of objects that does not have a corresponding object in said second set of said two sets of objects;

generate a node for said tree for each object of said second set of said two sets of objects that does not have a corresponding object in said first set of said two sets of objects; and display said tree on a display device.

30. A machine readable medium having stored thereon a program for causing a computer to:

identify two or more object pairs of two or more sets of objects to compare, an object pair comprising an object from a first set of said two or more sets of objects and a corresponding object from a second set of said two or more sets of objects;

generate a representation of each of said two or more object pairs of said two or more sets of objects; and compare a first object pair of said two or more object pairs, said first object pair determined by a user.

31. A machine readable medium having stored thereon a program for causing a computer to:

identify a first object from a first set of two or more sets of objects to compare; identify a second object from said first set of said two or more sets of objects to compare;

identify a third object from a second set of said two or more sets of objects to compare;

identify a fourth object from said second set of said two or more sets of objects to compare;

compare said first object and said third object;

compare said second object and said fourth object;

display a result of the comparison of said first object and said third object prior to the completion of the comparison of said second object and said fourth object; and display a result of the comparison of said second object and said fourth object.

* * * * *